US012520307B2

(12) United States Patent
Zewail et al.

(10) Patent No.: US 12,520,307 B2
(45) Date of Patent: Jan. 6, 2026

(54) DEMODULATION REFERENCE SIGNAL BUNDLING ACROSS A SUBSET OF DEMODULATION REFERENCE SIGNAL PORTS

(71) Applicant: QUALCOMM Incorporated, San Diego, CA (US)

(72) Inventors: Ahmed Abdelaziz Ibrahim Abdelaziz Zewail, San Diego, CA (US); Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 18/185,253

(22) Filed: Mar. 16, 2023

(65) Prior Publication Data

US 2024/0314770 A1 Sep. 19, 2024

(51) Int. Cl.
*G01R 31/08* (2020.01)
*H04L 25/02* (2006.01)
*H04W 72/1268* (2023.01)

(52) U.S. Cl.
CPC ..... *H04W 72/1268* (2013.01); *H04L 25/0202* (2013.01)

(58) Field of Classification Search
CPC .. H04L 25/0202; H04L 5/0092; H04W 72/04; H04W 72/1263; H04W 72/1268
See application file for complete search history.

(56) References Cited

U.S. PATENT DOCUMENTS

| | | | |
|---|---|---|---|
| 2018/0368175 A1* | 12/2018 | Jeon | H04W 72/04 |
| 2021/0167914 A1* | 6/2021 | Kwak | H04B 7/0695 |
| 2022/0247601 A1 | 8/2022 | Sridharan et al. | |
| 2022/0360394 A1 | 11/2022 | Ly et al. | |
| 2023/0216632 A1* | 7/2023 | Go | H04L 5/0051 370/329 |

OTHER PUBLICATIONS

Interdigital Inc: "Discussions on joint channel estimation for PUSCH", R1-2100733, 3rd Generation Partnership Project, Mobile Competence Centre, 650, Route Des Lucioles, F-06921 Sophia-antipolis Cedex, France, vol. RAN WG1, No. e-Meeting, Jan. 25, 2021-Feb. 5, 2021, Jan. 19, 2021, 7 Pages, XP051971176, section 2.3.
International Search Report and Written Opinion—PCT/US2024/015043—ISA/EPO—May 31, 2024.

* cited by examiner

*Primary Examiner* — Shantell L Heiber
(74) *Attorney, Agent, or Firm* — Holland & Hart LLP

(57) ABSTRACT

Methods, systems, and devices for wireless communication are described. A user equipment (UE) may receive a control message that indicates a set of demodulation reference signal (DMRS) ports for DMRS communication between the UE and a network entity. The UE may select a subset of DMRS ports from the set of DMRS ports for DMRS bundling across a set of transmission occasions. The subset of DMRS ports may have fewer DMRS ports than the set of DMRS ports. The UE may communicate a set of DMRSs with the network entity over the set of transmission occasions using the set of DMRS ports. A portion of the set of DMRSs may correspond to the subset of DMRS ports, may satisfy a power condition for DMRS bunding, and may satisfy a phase continuity condition for DMRS bundling.

30 Claims, 18 Drawing Sheets

DEMODULATION REFERENCE SIGNAL BUNDLING ACROSS A SUBSET OF DEMODULATION REFERENCE SIGNAL PORTS

FIELD OF TECHNOLOGY

The following relates to wireless communication, including demodulation reference signal (DMRS) bundling across a subset of DMRS ports.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). In some wireless communications systems, a communication device may perform channel estimation using reference signals transmitted by another communication device. In some cases, existing techniques for performing channel estimation may be deficient.

SUMMARY

The described techniques relate to improved methods, systems, devices, and apparatuses that support demodulation reference signal (DMRS) bundling across a subset of DMRS ports. For example, the described techniques provide a framework for selecting a subset of DMRS ports to bundle over multiple transmission occasions. In some examples, a user equipment (UE) may receive a control message that indicates a set of DMRS ports for DMRS communication between the UE and a network entity. The UE may select a subset of DMRS ports from the set of DMRS ports for DMRS bundling across a set of transmission occasions. The subset of DMRS ports may have fewer DMRS ports than the set of DMRS ports.

The UE may communicate a set of DMRSs with the network entity over the set of transmission occasions using the set of DMRS ports. In some examples, the UE may receive at least a portion of the set of DMRSs across the set of transmission occasions. The portion of the set of DMRSs may correspond to the subset of DMRS ports and may satisfy a power condition and a phase continuity condition for DMRS bundling. In such examples, the UE may estimate a property of a channel for wireless communications between the UE and the network entity using the portion of the set of DMRSs. In some other examples, the UE may transmit the portion of the set of DMRSs to the network entity over the set of transmission occasions using the subset of DMRS ports. In such an example, the network entity may estimate a property of the channel for wireless communications between the UE and the network entity using the portion of the set of DMRSs.

A method for wireless communications at a user equipment (UE) is described. The method may include receiving a control message that indicates a set of DMRS ports for DMRS communication between the UE and a network entity, selecting a subset of DMRS ports from the set of DMRS ports for DMRS bundling across a set of multiple transmission occasions, the subset of DMRS ports having fewer DMRS ports than the set of DMRS ports, and communicating, between the UE and the network entity, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

An apparatus for wireless communications at a UE is described. The apparatus may include a processor, memory coupled with the processor, and instructions stored in the memory. The instructions may be executable by the processor to cause the apparatus to receive a control message that indicates a set of DMRS ports for DMRS communication between the UE and a network entity, select a subset of DMRS ports from the set of DMRS ports for DMRS bundling across a set of multiple transmission occasions, the subset of DMRS ports having fewer DMRS ports than the set of DMRS ports, and communicating, between the UE and the network entity, a set of multiple DMRSs over the set of multiple transmission occasions used the set of DMRS ports, where a portion of the set of multiple DMRSs corresponds to the subset of DMRS ports and satisfies a power condition and a phase continuity condition for DMRS bundling.

Another apparatus for wireless communications at a UE is described. The apparatus may include means for receiving a control message that indicates a set of DMRS ports for DMRS communication between the UE and a network entity, means for selecting a subset of DMRS ports from the set of DMRS ports for DMRS bundling across a set of multiple transmission occasions, the subset of DMRS ports having fewer DMRS ports than the set of DMRS ports, and means for communicating, between the UE and the network entity, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

A non-transitory computer-readable medium storing code for wireless communications at a UE is described. The code may include instructions executable by a processor to receive a control message that indicates a set of DMRS ports for DMRS communication between the UE and a network entity, select a subset of DMRS ports from the set of DMRS ports for DMRS bundling across a set of multiple transmission occasions, the subset of DMRS ports having fewer DMRS ports than the set of DMRS ports, and communicating, between the UE and the network entity, a set of multiple DMRSs over the set of multiple transmission occasions used the set of DMRS ports, where a portion of the set of multiple DMRSs corresponds to the subset of DMRS ports and satisfies a power condition and a phase continuity condition for DMRS bundling.

In some examples of the method, apparatuses, and non-transitory computer-readable medium described herein, communicating the set of multiple DMRSs may include operations, features, means, or instructions for receiving at least the portion of the set of multiple DMRSs across the set of multiple transmission occasions and estimating a property of a channel for wireless communications between the UE and the network entity using the portion of the set of multiple DMRSs, where the property of the channel may be jointly estimated for each DMRS port of the set of DMRS ports based on DMRS bundling across the set of multiple transmission occasions.

In some examples of the method, apparatuses, and non-transitory computer-readable medium described herein, communicating the set of multiple DMRSs may include operations, features, means, or instructions for transmitting the portion of the set of multiple DMRSs over the set of multiple transmission occasions using the subset of DMRS ports, where the portion of the set of multiple DMRSs satisfies the power condition and the phase continuity condition based on the UE maintaining the power condition and the phase continuity condition for the subset of DMRS ports over the set of multiple transmission occasions.

Some examples of the method, apparatuses, and non-transitory computer-readable medium described herein may further include operations, features, means, or instructions for receiving a second control message that schedules a set of multiple repetitions of a transport block during the set of multiple transmission occasions, each repetition of the set of multiple repetitions corresponding to a respective transmission occasion of the set of multiple transmission occasions.

Some examples of the method, apparatuses, and non-transitory computer-readable medium described herein may further include operations, features, means, or instructions for receiving one or more control messages that schedule communication of a set of multiple transport blocks during the set of multiple transmission occasions, each transport block of the set of multiple transport blocks corresponding to a respective transmission occasion of the set of multiple transmission occasions.

Some examples of the method, apparatuses, and non-transitory computer-readable medium described herein may further include operations, features, means, or instructions for receiving one or more control messages that schedule the set of multiple transmission occasions, the set of multiple transmission occasions including at least one communication via a shared channel and at least one other communication via a control channel.

In some examples of the method, apparatuses, and non-transitory computer-readable medium described herein, selecting the subset of DMRS ports may include operations, features, means, or instructions for excluding from the subset of DMRS ports one or more DMRS ports of the set of DMRS ports that may be unused for DMRS communication between the UE and the network entity during at least one transmission occasion of the set of multiple transmission occasions.

In some examples of the method, apparatuses, and non-transitory computer-readable medium described herein, selecting the subset of DMRS ports may include operations, features, means, or instructions for selecting the subset of DMRS ports from the set of DMRS ports based on a respective order of each DMRS port of the subset of DMRS ports within the set of DMRS ports.

Some examples of the method, apparatuses, and non-transitory computer-readable medium described herein may further include operations, features, means, or instructions for receiving an indication of a quantity of DMRS ports to be included in the subset of DMRS ports.

Some examples of the method, apparatuses, and non-transitory computer-readable medium described herein may further include operations, features, means, or instructions for receiving, from the network entity, an indication of one or more DMRS ports of the set of DMRS ports used for DMRS bundling, where the subset of DMRS ports includes the one or more DMRS ports.

In some examples of the method, apparatuses, and non-transitory computer-readable medium described herein, selecting the subset of DMRS ports may include operations, features, means, or instructions for selecting the subset of DMRS ports from the set of DMRS ports based on one or more of: a code division multiplexing (CDM) group, a codeword, or a transmission configuration indicator (TCI) state associated with each DMRS port of the subset of DMRS ports.

In some examples of the method, apparatuses, and non-transitory computer-readable medium described herein, the subset of DMRS ports includes a same quantity of DMRS ports across the set of multiple transmission occasions.

In some examples of the method, apparatuses, and non-transitory computer-readable medium described herein, the subset of DMRS ports may be associated with a same precoding resource block group (PRG) size across the set of multiple transmission occasions.

In some examples of the method, apparatuses, and non-transitory computer-readable medium described herein, the set of DMRS ports may be associated with a set of multiple codewords and the subset of DMRS ports may be associated with a codeword of the set of multiple codewords.

A method for wireless communications at a network entity is described. The method may include outputting a control message that indicates a set of DMRS ports for DMRS communication between the network entity and a UE, selecting a subset of DMRS ports from the set of DMRS ports for DMRS bundling across a set of multiple transmission occasions, the subset of DMRS ports having fewer DMRS ports than the set of DMRS ports, and communicating, between the network entity and the UE, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

An apparatus for wireless communications at a network entity is described. The apparatus may include a processor, memory coupled with the processor, and instructions stored in the memory. The instructions may be executable by the processor to cause the apparatus to output a control message that indicates a set of DMRS ports for DMRS communication between the network entity and a UE, select a subset of DMRS ports from the set of DMRS ports for DMRS bundling across a set of multiple transmission occasions, the subset of DMRS ports having fewer DMRS ports than the set of DMRS ports, and communicating, between the network entity and the UE, a set of multiple DMRSs over the set of multiple transmission occasions used the set of DMRS ports, where a portion of the set of multiple DMRSs corresponds to the subset of DMRS ports and satisfies a power condition and a phase continuity condition for DMRS bundling.

Another apparatus for wireless communications at a network entity is described. The apparatus may include means for outputting a control message that indicates a set of DMRS ports for DMRS communication between the network entity and a UE, means for selecting a subset of DMRS ports from the set of DMRS ports for DMRS bundling across a set of multiple transmission occasions, the subset of DMRS ports having fewer DMRS ports than the set of DMRS ports, and means for communicating, between the network entity and the UE, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

A non-transitory computer-readable medium storing code for wireless communications at a network entity is described. The code may include instructions executable by a processor to output a control message that indicates a set of DMRS ports for DMRS communication between the network entity and a UE, select a subset of DMRS ports from the set of DMRS ports for DMRS bundling across a set of multiple transmission occasions, the subset of DMRS ports having fewer DMRS ports than the set of DMRS ports, and communicating, between the network entity and the UE, a set of multiple DMRSs over the set of multiple transmission occasions used the set of DMRS ports, where a portion of the set of multiple DMRSs corresponds to the subset of DMRS ports and satisfies a power condition and a phase continuity condition for DMRS bundling.

In some examples of the method, apparatuses, and non-transitory computer-readable medium described herein, communicating the set of multiple DMRSs may include operations, features, means, or instructions for obtaining at least the portion of the set of multiple DMRSs across the set of multiple transmission occasions and estimating a property of a channel for wireless communications between the network entity and the UE using the portion of the set of multiple DMRSs, where the property of the channel may be jointly estimated for each DMRS port of the set of DMRS ports based on DMRS bundling across the set of multiple transmission occasions.

In some examples of the method, apparatuses, and non-transitory computer-readable medium described herein, communicating the set of multiple DMRSs may include operations, features, means, or instructions for outputting the portion of the set of multiple DMRSs over the set of multiple transmission occasions using the subset of DMRS ports, where the portion of the set of multiple DMRSs satisfies the power condition and the phase continuity condition based on the network entity maintaining the power condition and the phase continuity condition for the subset of DMRS ports over the set of multiple transmission occasions.

Some examples of the method, apparatuses, and non-transitory computer-readable medium described herein may further include operations, features, means, or instructions for outputting a second control message that schedules a set of multiple repetitions of a transport block during the set of multiple transmission occasions, each repetition of the set of multiple repetitions corresponding to a respective transmission occasion of the set of multiple transmission occasions.

Some examples of the method, apparatuses, and non-transitory computer-readable medium described herein may further include operations, features, means, or instructions for outputting one or more control messages that schedule communication of a set of multiple transport blocks during the set of multiple transmission occasions, each transport block of the set of multiple transport blocks corresponding to a respective transmission occasion of the set of multiple transmission occasions.

Some examples of the method, apparatuses, and non-transitory computer-readable medium described herein may further include operations, features, means, or instructions for outputting one or more control messages that schedule the set of multiple transmission occasions, the set of multiple transmission occasions including at least one communication via a shared channel and at least one other communication via a control channel.

In some examples of the method, apparatuses, and non-transitory computer-readable medium described herein, selecting the subset of DMRS ports may include operations, features, means, or instructions for excluding from the subset of DMRS ports one or more DMRS ports of the set of DMRS ports that may be unused for DMRS communication between the UE and the network entity during at least one transmission occasion of the set of multiple transmission occasions.

In some examples of the method, apparatuses, and non-transitory computer-readable medium described herein, selecting the subset of DMRS ports may include operations, features, means, or instructions for selecting the subset of DMRS ports from the set of DMRS ports based on a respective order of each DMRS port of the subset of DMRS ports within the set of DMRS ports.

Some examples of the method, apparatuses, and non-transitory computer-readable medium described herein may further include operations, features, means, or instructions for outputting an indication of a quantity of DMRS ports to be included in the subset of DMRS ports.

Some examples of the method, apparatuses, and non-transitory computer-readable medium described herein may further include operations, features, means, or instructions for outputting an indication of one or more DMRS ports of the set of DMRS ports used for DMRS bundling, where the subset of DMRS ports includes the one or more DMRS ports.

In some examples of the method, apparatuses, and non-transitory computer-readable medium described herein, selecting the subset of DMRS ports may include operations, features, means, or instructions for selecting the subset of DMRS ports from the set of DMRS ports based on one or more of: a CDM group, a codeword, or a TCI state associated with each DMRS port of the subset of DMRS ports.

In some examples of the method, apparatuses, and non-transitory computer-readable medium described herein, the subset of DMRS ports includes a same quantity of DMRS ports across the set of multiple transmission occasions.

In some examples of the method, apparatuses, and non-transitory computer-readable medium described herein, the subset of DMRS ports may be associated with a same PRG size across the set of multiple transmission occasions.

In some examples of the method, apparatuses, and non-transitory computer-readable medium described herein, the set of DMRS ports may be associated with a set of multiple codewords and the subset of DMRS ports may be associated with a codeword of the set of multiple codewords.

DETAILED DESCRIPTION

Figure 1:
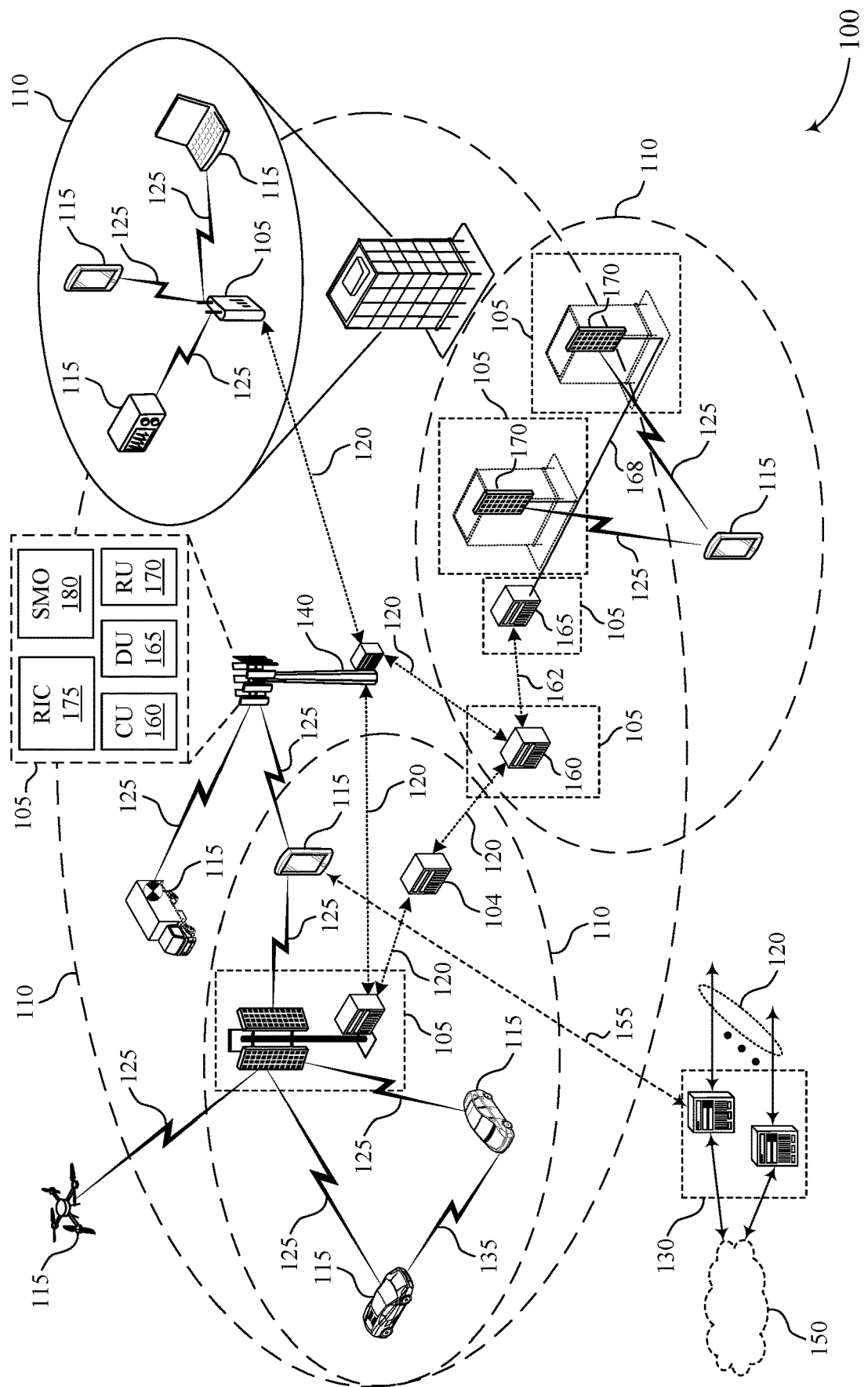
FIGS. 1 through 3 each show an example of a wireless communications system that supports demodulation reference signal (DMRS) bundling across a subset of DMRS ports in accordance with one or more aspects of the present disclosure.

Some wireless communications systems may support beamforming operations for directional communications. Beamforming involves a signal processing technique in which a transmitting communication device, or a receiving communication device, or both, select, shape, or steer an antenna beam (e.g., a directional beam) along a spatial path between the communication devices (e.g., between a network entity and a user equipment (UE)). In some examples, beamforming applied by a first communication device may be based on channel estimation performed using reference signals transmitting by a second communication device. For example, the first communication device may transmit multiple messages that include one or more reference signals to the second communication device, which the second communication device may use to estimate a property of a channel used for wireless communications between the communication devices. In some examples, the second communication device may jointly process (e.g., bundle) the messages. For example, the first communication device may use a set of demodulation reference signal (DMRS) ports to transmit the messages across multiple (e.g., different) transmission occasions and each message may include one or more DMRSs. A DMRS port may refer to an antenna port used for transmission of reference signals, such as DMRSs. In such an example, the second communication device may use DMRS bundling to jointly process the DMRSs across the multiple transmission occasions, which may lead to improved channel estimation at the second communication device. In some cases, however, an accuracy of channel estimation using a DMRS bundle may depend on power consistency and phase continuity of the DMRS bundle. For example, the first communication device may use a set of parameters to transmit the DMRS bundle using the set of DMRS ports. A change in the set of parameters (or an aspect of the set of parameters) for one or more of the DMRS ports across the multiple transmission occasions (e.g., and therefore across the multiple DMRSs) may impact the power consistency and phase continuity of the DMRS bundle, which may degrade channel estimation.

Various aspects of the present disclosure relate to techniques for DMRS bundling across a subset of DMRS ports and, more specifically, to a framework for selecting a subset of DMRS ports to bundle over multiple transmission occasions. For example, a network entity may configure a UE with a set of DMRS ports for DMRS communication between the UE and the network entity. That is, the network entity and the UE may use the set of DMRS ports to communicate a set of DMRSs between the UE and the network entity over multiple transmission occasions. The UE or network entity, or both, may select a subset of DMRS ports from the set of DMRS ports to use for DMRS bundling. For example, for downlink DMRS communications, the network entity may select the subset of DMRS ports and may maintain a power condition (e.g., power consistency) and a phase continuity condition for the subset of DMRS ports across multiple transmission occasions. In such an example, the UE may select the subset of DMRS ports (e.g., autonomously or based on signaling from the network entity) and use a portion of the set of DMRSs transmitted via the subset of DMRS ports for channel estimation. For uplink DMRS communications, the UE may select the subset of DMRS ports and may maintain the power condition and the phase continuity condition for the subset of DMRS ports across the multiple transmission occasions. In such an example, the network entity may select the subset of DMRS ports and use a portion of the set of DMRSs transmitted via the subset of DMRS ports for channel estimation. DMRSs transmitted via the subset of DMRS ports may satisfy the power condition and the phase continuity condition for DMRS bundling based on the UE (e.g., for uplink) or the network entity (e.g., for downlink) maintaining the power condition and the phase continuity condition for the subset of DMRS ports.

Aspects of the subject matter described herein may be implemented to realize one or more of the following potential advantages. For example, the techniques employed by the described communication devices may provide benefits and enhancements to the operation of the communication devices, including enabling a mechanism for DMRS port selection at the communication devices such that channel estimations are more accurate. The operations performed by the described communication devices to improve channel estimation may include selecting a subset of DMRS ports in which a power condition and a phase continuity condition may be satisfied across multiple transmission occasions. In some examples, operations performed by the described communication devices may also support increased reliability of communications within a wireless communications system, among other benefits.

Aspects of the disclosure are initially described in the context of wireless communications systems. Aspects of the disclosure are also described in the context of time domain window (TDW) diagrams and process flows. Aspects of the disclosure are further illustrated by and described with reference to apparatus diagrams, system diagrams, and flowcharts that relate to DMRS bundling across a subset of DMRS ports.

FIG. 1 shows an example of a wireless communications system 100 that supports DMRS bundling across a subset of DMRS ports in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support DMRS bundling across a subset of DMRS ports as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of Ts=1/ ($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may support beamforming operations for directional communications. In some examples, beamforming applied at a UE 115 or a network entity 105 may be based on channel estimation performed using reference signals. To improve channel estimation, the UE 115 or the network entity 105 may use DMRS bundling. However, an accuracy of channel estimation using DMRS bundling may depend on power consistency and phase continuity of a DMRS bundle used for the DMRS bundling.

In some examples, the UE 115 and the network entity 105 may support a framework for selecting a subset of DMRS ports to bundle over multiple transmission occasions. For example, the network entity 105 may configure the UE 115 with a set of DMRS ports for communication (e.g., DMRS communication) between the UE 115 and the network entity 105. In some examples, the network entity 105 may use control signaling (e.g., RRC signaling, downlink control information (DCI)) to configure the UE 115 with the set of DMRS ports. The network entity 105 may use one or more antenna port indices (e.g., in DCI) to configure the UE 115 with a quantity of DMRS ports. A DMRS port may refer to an antenna port used for transmission of reference signals (e.g., DMRSs). For example, the network entity 105 and the UE 115 may use the set of DMRS ports to communicate a set of DMRSs between the UE 115 and the network entity 105 over multiple transmission occasions. In some examples, the UE 115 and the network entity 105 may select a subset of DMRS ports from the set of DMRS ports to use for DMRS bundling. For downlink communications, the network entity 105 may maintain a power condition and a phase continuity condition for the subset of DMRS ports across multiple transmission occasions and the UE 115 may use DMRSs transmitted via the subset of DMRS ports for channel estimation. For uplink communications, the UE 115 may maintain the power condition and the phase continuity condition for the subset of DMRS ports across the multiple transmission occasions and the network entity 105 may use the DMRSs transmitted via the subset of DMRS ports for channel estimation. In some examples, enabling the UE 115 and the network entity 105 to select a subset of DMRS ports in which a power condition and a phase continuity condition may be satisfied across multiple transmission occasions may lead to improved channel estimation and increased reliability of communications within the wireless communications system 100, among other benefits.

Figure 2:
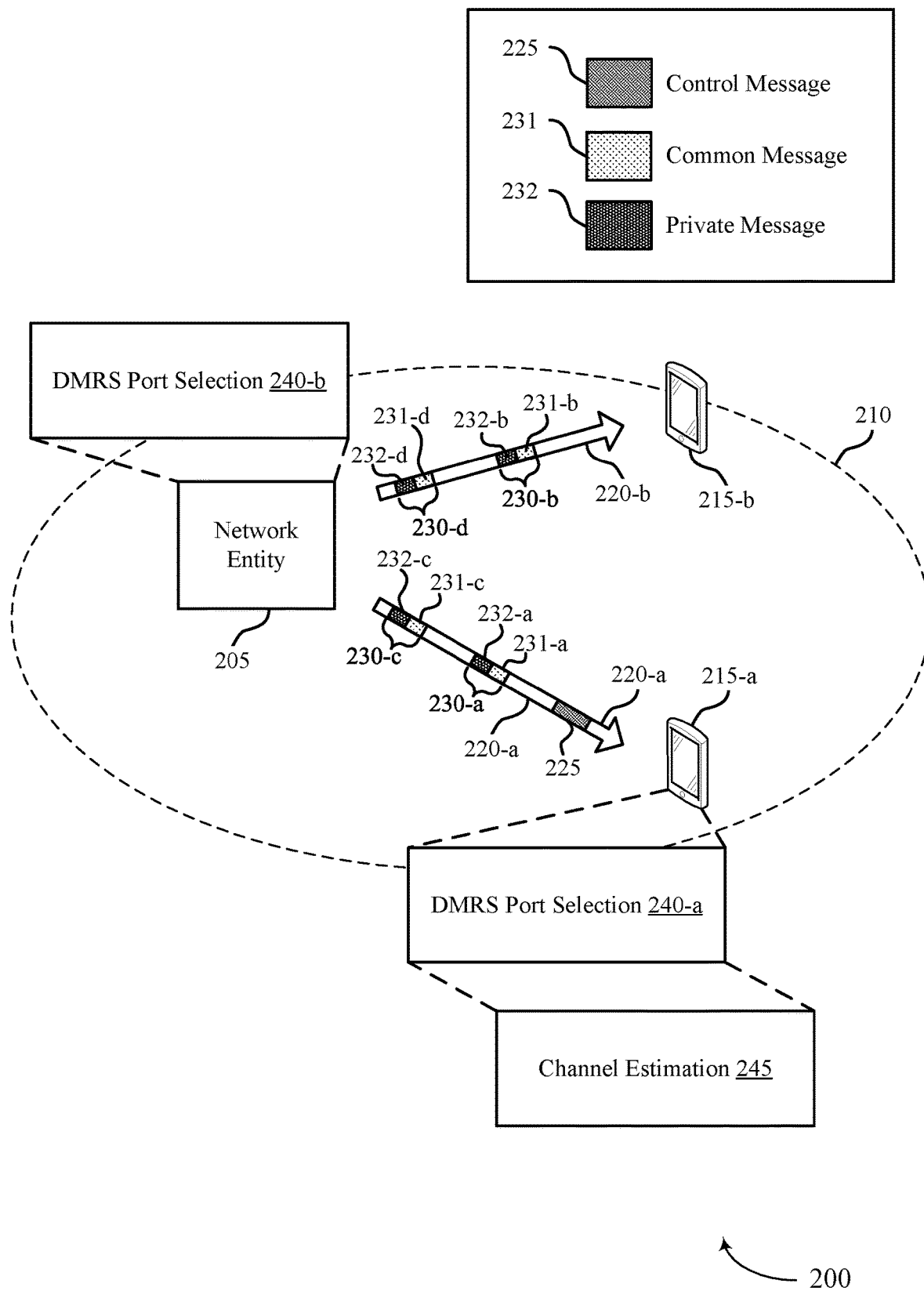

FIG. 2 shows an example of a wireless communications system 200 that supports DMRS bundling across a subset of DMRS ports in accordance with one or more aspects of the present disclosure. The wireless communications system 200 may implement or be implemented at one or more aspects of the wireless communications system 100. For example, the wireless communications system 200 may include a UE 215-a, a UE 215-b, and a network entity 205, which may be examples of the corresponding devices illustrated by and described with reference to FIG. 1. The network entity 205 may communicate with the UE 215-a and the UE 215-b via a communication link 220-a and communication link 220-b, respectively. The communication links 220 may be examples of a communication link 125 illustrated by and described with reference to FIG. 1. For example, the communication links 220 may be examples of downlinks (e.g., access links, Uu interfaces). The network entity 205 may serve a cell providing a coverage area 210, which may be an example of a coverage area 110 illustrated by and described with reference to FIG. 1.

The wireless communications system 200 (e.g., a 6G system, a 5G-advanced system) may enable one or more MIMO techniques. For example, the network entity 205 may use MU-MIMO to communicate (e.g., concurrently) with the UE 215-a and the UE 215-b. In some examples, the network entity 205 may use rate splitting for MU-MIMO communications with the UEs 215. For example, the network entity 205 may use rate splitting MU-MIMO in which messages of the UEs 215 (e.g., individual users) may be split into common parts (e.g., common messages) and private parts (e.g., private messages). That is, a message for a MU-MIMO user may be split into a common message and a private message. The common message may be common to the MU-MIMO user and one or more other MU-MIMO users, while the private message may be individual to the MU-MIMO user. In other words, a common message may include information (e.g., a data packet or a portion of a data packet) intended for multiple MU-MIMO users (e.g., the UE 215-a and the UE 215-b), while a private message may include information (e.g., a data packet or a portion of a data packet) intended for a single MU-MIMO user (e.g., the UE 215-a or the UE 215-b). The network entity 205 may use a common stream (e.g., a common data stream) to transmit common messages and private streams (e.g., private data stream) to transmit private messages. Rate splitting techniques may be used for a broadcast channel or one or more other types of channels. In some examples, rate splitting techniques may lead to a relatively larger degree of freedom or capacity (or both) for the wireless communications system 200 (e.g., a 5G-advanced system, a 6G system), among other benefits.

As illustrated in the example of FIG. 2, the network entity 205 may use rate splitting to split (e.g., partitioned, divided) one or more messages for the UEs 215 into common messages and private messages. In other words, the network entity 205 may split messages of individual users into common and private parts. For example, during a first transmission occasion the network entity 205 may transmit a message 230-a to the UE 215-a and a message 230-b to the UE 215-b. The message 230-a ($W_1$) may include a common message 231-a ($W_{1,c}$) and a private message 232-a ($W_{1,p}$). The message 230-b ($W_2$) may include a common message 231-b ($W_{2,c}$) and a private message 232-b ($W_{2,p}$). The common messages 231 may be common to both the UE 215-a and the UE 215-b, while the private message 232-a may be for (e.g., individual to) the UE 215-a and the private message 232-b may be for (e.g., individual to the UE 215-b).

In some examples, the network entity 205 may transmit the common messages 231 to the UEs 215 via a common stream ($X_c$). For example, the network entity 205 may use a combiner to concatenate the common message 231-a and the common message 231-b into a single common message ($W_c$) that the network entity 205 may encode to the common stream (e.g., for transmission via one or more antennas across one or more TRPs). That is, the network entity 205 may transmit a single common message ($W_c$) via the common stream that includes the common message 231-a ($W_{1,c}$) and the common message 231-b ($W_{2,c}$). In other words, a common part of messages (e.g., individual messages) of two or more UEs (e.g., two or more MU-MIMO users, such as the UEs 215) may be concatenated into a single common message ($W_c$) and encoded and modulated a common stream ($X_c$). The common stream may include one or more layers and may be precoded (e.g., by a precoding matrix ($P_c$)) and transmitted by one or more transmit antennas (e.g., from one TRPs, one or more gNBs, or multiple TRPs in a coordinated multi-point (COMP) scenario).

Additionally, or alternatively, the network entity 205 may transmit the private messages 232 to the UEs 215 via private streams. For example, the network entity 205 may transmit the private message 232-a ($W_{1,p}$) to the UE 215-a via a first private stream ($X_1$) and the private message 232-b ($W_{2,p}$) to the UE 215-b via a second private stream ($X_2$). In other words, a private part of a message (e.g., an individual message, $W_{1,p}$ or $W_{2,p}$) may be encoded (e.g., separately encoded) and modulated to a respective private stream (e.g., $X_1$ or $X_2$) for the corresponding MU-MIMO user (e.g., the UE 215-a or the UE 215-b). In some examples, encoding may include modulation and mapping to one or more layers (e.g., including codeword-layer mapping). For example, in addition to encoding, the network entity 205 may perform modulation and mapping. In some examples, a private stream may be precoded by a respective precoder (e.g., $X_1$ may be precoded by $P_1$ and $X_2$ may be precoded by $P_2$) and transmitted by one or more transmit antennas (e.g., from one TRPs, one or more gNBs, or multiple TRPs in a CoMP scenario). In other words, the network entity 205 may use three data streams to transmit the message 230-a and the message 230-b. For example, the network entity 205 may transmit the common message (e.g., including the common message 231-a and the common message 231-b) via the common stream ($X_c$), the private message 232-a via the first private streams ($X_1$), and the private message 232-b via the second private stream ($X_2$). In some examples, precoding for a data stream (X) that includes multiple private streams (e.g., $X_1$ and $X_2$) and a common stream (e.g., $X_c$) may be described in accordance with the following Equation 1:

$$X = P_c X_c + P_1 X_1 + P_2 X_2. \tag{1}$$

In some examples, receivers of the common messages 231, such as the UEs 215, may use the common messages 231 for interference cancelation. That is, at the receiver side, a common part of a message for a UE may be used for interference cancelation at the UE, for example, to improved decoding of a private part of the message. As illustrated in the example of FIG. 2, the UEs 215 may use the common messages 231 for interference cancelation to improve decoding of the private messages 232. For example, the UEs 215 (e.g., each of the UEs 215) may decode the common message ($W_c$). The UE 215-a may decode the common message 231-a and the UE 215-b may decode the common message 231-b. In some examples, decoding the common message ($W_c$) may serve one or more functions (e.g., may have two purposes). For example, one or more portions of the messages 230 for the UEs 215 may be included in the common message ($W_c$). That is, the common message ($W_c$) may include the common message 231-a for the UE 215-a and the common message 231-b for the UE 215-b. Accordingly, the common message may include receptive information for each of the UEs 215. As such, the UEs 215 may decode the common message (e.g., the UE 215-a may decode the common message 231-a and the UE 215-b may decode the common message 231-b) to obtain the respective information. In other words, one or more parts of individual message for a UE (e.g., ($W_{1,c}$) or ($W_{2,c}$)) may be embedded in a common message ($W_c$) transmitted to multiple UEs. That is, one or more parts of a respective individual message for each UE (e.g., $W_{1,c}$ and $W_{2,c}$) may be embedded in a common message ($W_c$) and, as such, the common message may include respective information (e.g., data) intended for each UE. Accordingly, a common message may include information (e.g., data) for a UE (e.g., each UE) and the UE (e.g., each UE) may decode the common message to obtain the information.

The UEs 215 may use the common messages 231 for successive interference cancelation (SIC). For example, UEs 215 may use the common messages 231 for SIC to improve decoding for the private messages 232. The network entity 205 may transmit the message 230-a (e.g., a signal ($Y_1$)) to the UE 215-a via the common stream (e.g., carrying the common message 231-a) and the first private stream (e.g., carrying the private message 232-a). In response to receiving the message 230-a, the UE 215-a may decode the common message 231-a and perform SIC. In some examples, such as part of SIC, the UE 215-a may reconstruct the common stream, subtract the reconstructed common stream from the receive signal (e.g., the message 230-a) to obtain a portion of the received signal that corresponds to the first private stream (e.g., the private message 232-a, a signal ($Y_{1,p}$)), and decode the private message 232-a ($W_{1,p}$). That is, the UE 215-a estimates a channel (e.g., an effective channel) corresponding to the common stream ($\hat{H}_1 P_c$), decodes the common message ($W_c$), re-encodes the common message to the common stream ($X_c$), multiplies the re-encoded common message by the estimated effective channel, and subtracts the re-encoded common message from received signal. In some examples, such as examples in which an accuracy of channel estimation may be relatively high and decoding of the common message is successful, the portion of the received signal that corresponds to the first private stream ($Y_{1,p}$) may be described in accordance with the following Equation 2:

$$Y_{1,p} = Y_1 - \hat{H}_1 P_c X_c = \hat{H}_1 P_1 X_1 + \hat{H}_1 P_2 X_2 + N_1 \tag{2}$$

in which $\hat{H}_1 P_1$ may correspond to a channel (e.g., an effective channel, an estimated channel) corresponding to the stream ($X_1$) the UE 215-a, $\hat{H}_1 P_2$ may correspond to a channel (e.g., an effective channel, an estimated channel) corresponding to the stream ($X_2$) for the UE 215-b, and $N_1$ may correspond to noise (e.g., channel noise associated with $X_1$). In such examples, the UE 215-a may use $Y_{1,p}$ to decode the private message 232-a. In some examples, decoding may include demodulation and de-mapping. For example, in addition to decoding, the UE 215-a (e.g., and the UE 215-b) may perform demodulation and de-mapping. Additionally, or alternatively, the UEs 215 may perform joint demodulation. For example, an alternative to SIC may include joint demodulation (e.g., of the private streams and the common stream) at the UEs 215. In such an example, the UE 215-a may decode (e.g., separately decode) the private message 232-a (e.g., a private codeword) and the common message (e.g., a common codeword, the common message 231-a).

In some examples, however, an accuracy of channel estimation may be relatively low. For rate splitting, a relatively low channel estimation accuracy (e.g., imperfect channel estimation) may degrade a performance of SIC (e.g., at the UEs 215). For example, the reconstructed common stream may be relatively inaccurate. In such an example, subtraction of the reconstructed common stream from the received signal (e.g., to decode the private codeword) may lead to partial cancelation of interference of the common stream (e.g., irrespective of the common codeword being successfully decoded). In other words, irrespective of the UE 215-a successfully decoding the common message 231-a (e.g., a common codeword), the reconstructed common stream may, in some cases, be relatively inaccurate (e.g., imperfect). In such cases, subtracting the reconstructed common stream from the received signal to decode the private message 232-a (e.g., a private codeword) may lead to interference of the common stream being partially canceled (e.g., interference of the common may not be fully canceled). In other words, channel estimation quality for the common stream may impact SIC operation.

In some examples, channel estimation at the network entity 205 or the UEs 215 may be based on reference signals transmitted between the network entity 205 and the UEs 215. For example, channel estimation 245 at the UE 215-a may be based on reference signals, such as DMRSs, transmitted to the UE 215-a from the network entity 205. The UEs 215 may use DMRS bundling across multiple (e.g., different) transmission occasions to improved channel estimation. For example, the UE 215-a may use DMRS bundling across the message 230-a and a message 230-c to improve channel estimation 245 (e.g., for decoding the message 230-a and the message 230-c using SIC). Similarly, the UE 215-b may use DMRS bundling across the message 230-b and a message 230-d to improve channel estimation at the UE 215-b (e.g., for decoding the message 230-b and the message 230-d using SIC). In other words, one way to improve channel estimation may include DMRS bundling across multiple (e.g., different) downlink messages (e.g., physical downlink shared channel (PDSCH) messages, physical downlink control channel (PDCCH) messages), in which each of the multiple downlink messages may be transmitted using rate splitting. For example, the network entity 205 may transmit the message 230-*a* (e.g., the common message 231-*a* and the private message 232-*a*) to the UE 215-*a* during the first transmission occasion and the message 230-*c* (e.g., a common message 231-*c* and a private message 232-*c*) to the UE 215-*a* during a second transmission occasion. Additionally, the network entity 205 may transmit the message 230-*b* (e.g., the common message 231-*b* and the private message 232-*b*) to the UE 215-*b* during the first transmission occasion and the message 230-*d* (e.g., a common message 231-*d* and a private message 232-*d*) to the UE 215-*b* during the second transmission occasion.

In some examples, the common message 231-*a* and the common message 231-*b* may be associated with a first common codeword (c-CW 1) and the common message 231-*c* and the common message 231-*d* may be associated with a second common codeword (c-CW 2). The first common codeword (c-CW 1) may be a same codeword as (e.g., a repetition of), or a different codeword than, the second common codeword (c-CW 2). The private message 232-*a* may be associated with a first private codeword for the UE 215-*a* (p-CW A1) and the private message 232-*c* may be associated with a second private codeword for the UE 215-*a* (p-CW A2). The first private codeword for the UE 215-*a* (p-CW A1) may be a same codeword as (e.g., a repetition of), or a different codeword than, the second private codeword for the UE 215-*a* (p-CW A2). That is, the message 230-*a* (e.g., PDSCH A1 for the UE 215-*a*) may include the first common codeword (c-CW 1) and the first private codeword for the UE 215-*a* (p-CW A1) and the message 230-*c* (e.g., PDSCH A2 for the UE 215-*a*) may include the second common codeword (c-CW 2) and the second private codeword for the UE 215-*a* (p-CW A2). Additionally, the private message 232-*b* may be associated with a first private codeword for the UE 215-*b* (p-CW B1) and the private message 232-*d* may be associated with a second private codeword for the UE 215-*b* (p-CW B2). The first private codeword for the UE 215-*b* (p-CW B1) may be a same codeword as (e.g., a repetition of), or a different codeword than, the second private codeword for the UE 215-*b* (p-CW B2). That is, the message 230-*b* (e.g., PDSCH B1 for the UE 215-*b*) may include the first common codeword (c-CW 1) and the first private codeword for the UE 215-*b* (p-CW B1) and the message 230-*d* (e.g., PDSCH B2 for the UE 215-*b*) may include the second common codeword (c-CW 2) and the second private codeword for the UE 215-*b* (p-CW B2).

The common messages 231 and the private message 232 may include (e.g., may each include) one or more DMRSs transmitted via one or more DMRS ports. For example, the network entity 205 may use a first set of DMRS ports to transmit DMRSs to the UE 215-*a*, in which a first portion of the first set of DMRS ports may be associated with the common stream and a second portion of the first set of DMRS ports may be associated with the first private stream. Similarly, the network entity 205 may use a second set of DMRS ports to transmit DMRSs to the UE 215-*b*, in which a first portion of the second set of DMRS ports may be associated with the common stream and a second portion of the second set of DMRS ports may be associated with the second private stream. One or more DMRS ports may be common to both the first set of DMRS ports and the second set of DMRS ports. In other words, the network entity may transmit one or more DMRSs to the UEs 215 via the common stream using one or more DMRS ports associated with the common stream during the first transmission occasion and the second transmission occasion. Additionally, the network entity 205 may transmit one or more DMRSs to the UE 215-*a* via the first private stream using one or more DMRS ports associated with the first private stream during the first transmission occasion and the second transmission occasion. Similarly, the network entity 205 may transmit one or more DMRSs to the UE 215-*b* via the second private stream using one or more DMRS ports associated with the second private stream during the first transmission occasion and the second transmission occasion. The UEs 215 may use DMRS bundling to jointly process (e.g., using SIC) the one or more DMRSs transmitted via the common stream with the one or more DMRSs transmitted via the private streams (e.g., to improve channel estimation) across the first transmission occasion and the second transmission occasion. That is, for the UE 215-*a*, the first set of DMRS ports (e.g., DMRS ports associated with the common stream and the first private stream) may be bundled across the message 230-*a* (PDSCH A1) and the message 230-*c* (PDSCH A2). Additionally, for the UE 215-*b*, the second set of DMRS ports (e.g., DMRS ports associated with the common stream and the second private stream) may be bundled across the message 230-*b* (PDSCH B1) and the message 230-*d* (PDSCH B2).

In some cases, however, it may be relatively difficult to bundle DMRSs transmitted via DMRS ports associated with private data streams. For example, an accuracy of channel estimation using a DMRS bundle (e.g., multiple DMRSs jointly processed using DMRS bundling) may depend on power consistency (e.g., a same or relatively similar transmission power or reception power across each DMRS included in the DMRs bundle) and phase continuity of the DMRS bundle. As an illustrative example, the network entity 205 may use a set of parameters to transmit a first set of DMRSs (e.g., in the message 230-*a*) to the UE 215-*a* during the first transmission occasion and a second set of DMRSs (e.g., in the message 230-*c*) to the UE 215-*a* during the second transmission occasion (e.g., using the first set of DMRS ports). The set of parameters may include a resource block allocation, a transmission power, a power control parameter, a timing advance value, a beam, a temporal gap between the first transmission occasion and the second transmission occasion, the DMRS ports (e.g., a quantity of DMRS ports), or a precoding resource block group (PRG) size, or any combination thereof.

In some examples, an event may lead to a change (e.g., difference) in one or more parameters (or an aspect of the one or more parameters) from the first transmission occasion to the second transmission occasion. For example, precoding of the first private stream may change relatively frequently (e.g., compared to the common stream) which may lead to a change in the one or more parameters (or the aspect of the one or more parameters) from the first transmission occasion to the second transmission occasion. That is, precoding for private streams (e.g., precoding for private codewords of multiple co-scheduled UEs) may change (e.g., be updated) relatively frequently (e.g., as the channel changes, such as due to interference nulling), which may lead to a change in the one or more parameters and impact DMRS bundling. For example, a difference in one or more parameters (or an aspect of one or more parameters) associated with the second portion of the first set of DMRS ports (e.g., the DMRS ports associated with the first private stream) from the first transmission occasion to the second transmission occasion may impact an RF transmission coherency (e.g., a phase continuity) across the first set of DMRSs and the second set of DMRSs, which may reduce an accuracy of channel estimation 245 (e.g., using the first set of DMRSs and the second set of DMRSs). In other words, failing to maintain phase continuity (e.g., and a power condition) for the second portion of the first set of DMRS ports (e.g., the DMRS ports associated with the first private stream) across the first transmission occasion and the second transmission occasion may degrade channel estimation 245 at the UE 215-a. As such, the network entity 205 (or the UE 215-a) may determine that DMRS ports associated with the first private stream (e.g., the private codeword for the UE 215-a, the private message 232-a and the private message 232-c) may impact DMRS bundling (e.g., and may not be desirable for DMRS bundling) and degrade channel estimation 245.

In some examples, the network entity 205 (e.g., and the UEs 215) may determine to perform (e.g., use) DMRS building for a subset of DMRS ports, such as DMRS ports associated with the common stream (e.g., for common codewords). For example, the UEs 215 (e.g., each of the UEs 215) may use DMRS bundling to jointly process (e.g., using SIC) the one or more DMRSs transmitted via the common stream across the first transmission occasion and the second transmission occasion. That is, for the UE 215-a, DMRS ports associated with the common stream (e.g., c-CW 1 and c-CW 2) may be bundled across the message 230-a (PDSCH A1) and the message 230-c (PDSCH A2). For the UE 215-b, DMRS ports associated with the common stream (e.g., c-CW 1 and c-CW 2) may be bundled across the message 230-b (PDSCH B1) and the message 230-d (PDSCH B2).

As illustrated in the example of FIG. 2, one or more techniques for DMRS bundling across a subset of DMRS ports, as described herein, may provide a framework for selecting a subset of DMRS ports to bundle over multiple transmission occasions. In some examples, the UE 215-a may receive a control message 225 from the network entity 205 that indicates a set of DMRS ports for DMRS communication between the UE 215-a and the network entity 205. For example, the control message may indicate the first set of DMRS ports.

The UE 215-a may communicate a set of DMRSs with the network entity 205 over the first transmission occasion and the second transmission occasions using the first set of DMRS ports. That is, the network entity 205 may use the first set of DMRS ports to transmit DMRSs to the UE 215-a. In some examples, the network entity 205 may use DMRS port selection 240-b to select a subset of DMRS ports from the first set of DMRS ports. The subset of DMRS ports may have fewer DMRS ports than the set of DMRS ports. For example, the network entity 205 may select a subset of DMRS ports from the first set of DMRS ports that are associated with the common stream. That is, the selected subset of DMRS ports may include the first portion of the first set of DMRS ports. The network entity 205 may maintain a power condition and a phase continuity condition for the subset of DMRS ports across the first transmission occasion and the second transmission occasion. In other words, the network entity 205 may use the DMRS port selection 240-b to select a subset of DMRS ports for which the network entity 205 may maintain a power condition and a phase continuity condition across multiple transmission occasions. Additionally, or alternatively, the UE 215-a may use DMRS port selection 240-a to select the subset of DMRS ports from the first set of DMRS ports for DMRS bundling across the first transmission occasion and the second transmission occasion. For example, the UE 215-a may select the subset of DMRS ports from the first set of DMRS ports that the network entity 205 may maintain the power condition and the phase continuity condition across the multiple transmission occasions. In other words, the UE 215-a may use the DMRS port selection 240-b to select the subset of DMRS ports that are associated with the common stream.

The UE 215-a may receive a portion of the first set of DMRSs across the first transmission occasion and the second transmission occasions. The portion of the first set of DMRSs may correspond to the subset of DMRS ports. That is, the UE 215-a may receive one or more DMRSs via the common stream using the subset of DMRS ports (e.g., the DMRS ports associated with the common stream) during the first transmission occasion and the second transmission occasion. Accordingly, the portion of the first set of DMRSs may satisfy the power condition and the phase continuity condition for DMRS bundling. In such examples, the UE 215-a may use the channel estimation 245 to estimate a property of a channel for wireless communications between the UE 215-a and the network entity 205 using the portion of the first set of DMRSs. In some examples, DMRS bundling using the portion of the first set of DMRSs (e.g., the subset DMRS ports) may improve the channel estimation 245, among other benefits.

Figure 3:
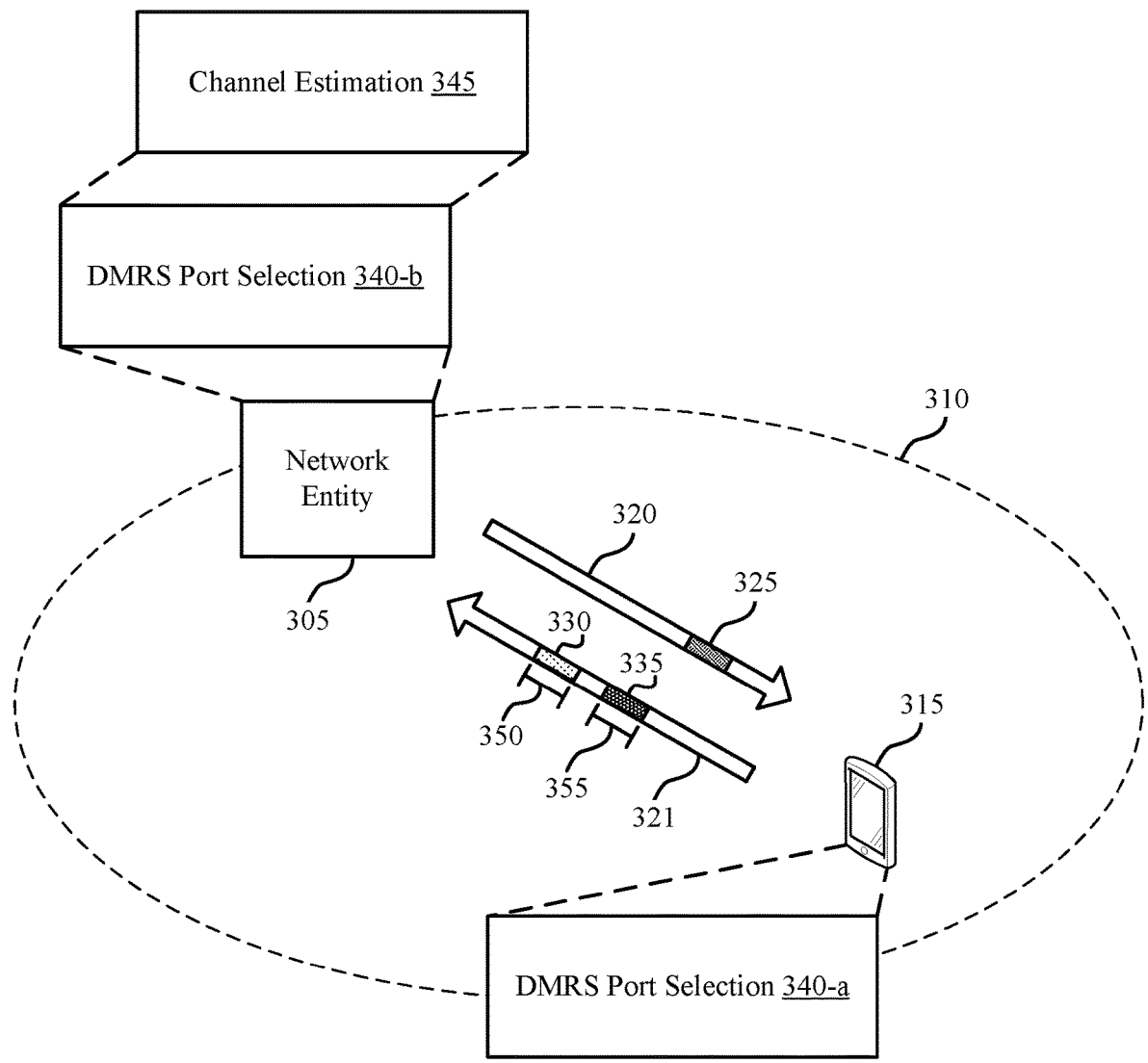
Figure 3:
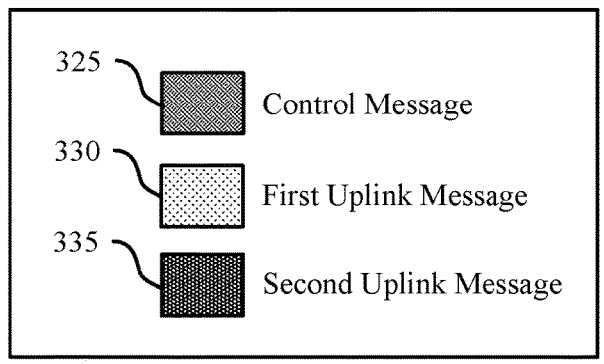

FIG. 3 shows an example of a wireless communications system 300 that supports DMRS bundling across a subset of DMRS ports in accordance with one or more aspects of the present disclosure. The wireless communications system 300 may implement or be implemented at one or more aspects of the wireless communications system 100 and the wireless communications system 200. For example, the wireless communications system 300 may include a UE 315 and a network entity 305, which may be examples of the corresponding devices illustrated by and described with reference to FIGS. 1 and 2. The network entity 305 may communicate with the UE 315 via a communication link 320 and a communication link 321, which may be examples of a communication link (e.g., an access link, a Uu interface) illustrated by and described with reference to FIGS. 1 and 2. For example, the communication link 320 may be an example of a downlink and the communication link 321 may be an example of an uplink. The network entity 305 may serve a cell providing a coverage area 310, which may be an example of a coverage area illustrated by and described with reference to FIGS. 1 and 2.

In some examples of the wireless communications system 300, the UE 315 may operate as a cell-edge UE. A cell-edge UE may refer to a UE located at a cell-edge (e.g., an edge of a cell). That is, in some examples, the UE 315 may operate at an edge of the cell providing the coverage area 310. In such examples, the UE 315 may be relatively far from the network entity 305 and wireless communications between the network entity 305 and the UE 315 may be impacted by external factors, such as a physical blocking object, signal fading, or other phenomena. To support communications for cell-edge users, such as the UE 315, the wireless communications system 300 may enable one or more techniques for coverage enhancement. For example, wireless communications system 300 may enable one or more coverage enhancements for cell-edge UEs via joint processing of DMRSs (e.g., to improve channel estimation). Joint processing of DMRSs, which may also be referred to as DMRS bundling, may be supported for uplink communications (e.g., for communications via a physical uplink shared channel (PUSCH) or a physical uplink control channel (PUCCH)) and for downlink communications (e.g., for communications via a PDSCH or a PDCCH). Additionally, or alternatively, joint processing of DMRSs (e.g., DMRS bundling) may be supported across repetitions (e.g., transmissions of a same transport block). For example, DMRS bundling may be supported across PUSCH repetitions, PUCCH repetitions, PDSCH repetitions, and PDCCH repetitions. Additionally, or alternatively, DMRS bundling may be supported across multiple (e.g., different) transport blocks, such as between a first PUSCH (or PDSCH) with a first transport block and a second PUSCH (or PDSCH) with a second transport block). In some examples, joint processing of DMRSs (e.g., DMRS bundling) may be applicable to a single-layer transmission (e.g., a one layer PUSCH or PDSCH) or a multi-layer transmission (e.g., a more than one layer PUSCH or PDSCH).

In some examples, the network entity 305 may perform DMRS bundling. For example, DMRSs for PUSCH (or PUCCH) repetitions may be bundled at the network entity 205 across multiple slots (e.g., an actual time domain window (TDW)) in which the UE 315 may maintain power consistency and phase continuity. In other words, DMRSs for PUSCH (or PUCCH) repetitions may be bundled across multiple slots that the UE 315 maintains power consistency and phase continuity and the network entity 305 (e.g., a gNB) may processes the DMRSs jointly (e.g., using DMRS bundling). The network entity 205 may determine a TDW (e.g., a nominal TDW that may include a set of transmission occasions) across which the network entity 205 may perform DMRS bundling. In some examples, the network entity 305 (e.g., and the UE 315) may determine the nominal TDW based on a quantity of repetitions, a configured TDW length (e.g., if configured), a DMRS bundling window duration (e.g., a maximum or otherwise suitable DMRS bundling window duration), or any combination thereof. In some examples, the DMRS bundling window duration may be based on one or more capabilities of the UE 315 (e.g., one or more UE capabilities).

In some examples, however, one or more events may lead to (e.g., cause, result in) power consistency and phase continuity being altered (e.g., failing to be maintained) across the nominal TDW. In such examples, the nominal TDW may be partitioned (e.g., broken up) into one or more actual TDWs. That is, the network entity 305 may determine that power consistency and phase continuity failed to be maintained across the nominal TDW (e.g., due to one or more events) and, as such, may partition (e.g., split, divide) the nominal TDP into one or more (smaller) actual TDWs across which power consistency and phase continuity may be maintained. In such examples, the network entity 305 (e.g., and the UE 315) may perform DMRS bundling during the one or more TDWs. Events that may lead to power consistency and phase continuity to be altered may include a change in an resource block allocation, a change in power, use of multiple (e.g., different) power control parameters (e.g., across the nominal TDW), a change in timing advance, a beam change, one or more intervening downlink measurements, downlink monitoring, downlink reception, or a gap between transmission occasions (e.g., within the nominal TDW) being greater than a threshold (e.g., about 13 symbols), among other examples.

In some examples, the network entity 305 and the UE 315 may determine to perform (e.g., use) DMRS building for a subset of DMRS ports across multiple channels. In such examples, the subset of DMRS ports for DMRS bundling may be based on a quantity of DMRS ports associated with the multiple channels (e.g., a respective quantity of DMRS ports associated with each of the multiple channels). For example, PUCCH transmissions between the network entity 305 and the UE 315 may be associated with a single DMRS port, while PUSCH transmissions between the network entity 305 and the UE 315 may be associated with multiple DMRS ports. In such an example, for DMRS bundling between PUCCH and PUSCH, a subset (e.g., one) of the PUSCH DMRS ports may be bundled with the PUCCH DMRS port. Additionally, or alternatively, PDCCH transmissions between the network entity 305 and the UE 315 may be associated with a single DMRS port, while PDSCH transmissions between the network entity 305 and the UE 315 may be associated with multiple DMRS ports. In such an example, a subset (e.g., one) of the PDSCH DMRS ports may be bundled with the single PDCCH DMRS port.

In some examples, a subset of DMRS ports used for DMRS bundling across multiple transmission occasions may depend on a quantity of layers associated with the transmission occasions (e.g., a respective quantity of layers associated with each transmission occasion). In a first transmission occasion, a first shared channel transmission (e.g., a PDSCH transmission, a PUSCH transmission) may be scheduled with a first quantity of layers, which may correspond to a first quantity of DMRS ports. For example, in a first transmission occasion 350, a first uplink message 330 may be scheduled with L layers (e.g., with L DMRS ports). In a second transmission occasion, a second shared channel transmission (e.g., another PDSCH transmission, another PUSCH transmission) may be scheduled with a second quantity of layers, which may correspond to a second quantity of DMRS ports. For example, in a second transmission occasion 355, a second uplink message 335 may be scheduled with L0 layers (e.g., L0 DMRS ports). In some examples, the second quantity of layers may be less than first quantity of layers (e.g., L0<L). Accordingly, the second quantity of DMRS ports may be less than the first quantity of DMRS ports.

In some examples, during the second transmission occasion 355, less layers (e.g., L0<L) may be available due to MU-MIMO of other users. Additionally, or alternatively, during the second transmission occasion 355, less layers may be used due to one or more reliability constraints being more stringent for the second transmission occasion 355 (e.g., due to transmission of a different transport block) than the first transmission occasion 350. That is, reliability constraints may be more stringent for the second transmission occasion 355 than the first transmission occasion 350 and, as such, a quantity of layers may be reduced from the first transmission occasion 350 to the second transmission occasion 355. In some examples, during the second transmission occasion 355, less layers may be used due to a transport block size being smaller for the second transmission occasion 355 (e.g., due to transmission of a different transport block that corresponds to remaining data in the buffer) than the first transmission occasion 350. That is, a transport block size may be smaller for the second transmission occasion 355 than the first transmission occasion 350 and, as such, a quantity of layers may be reduced from the first transmission occasion 350 to the second transmission occasion 355.

In some examples, a precoder for the second quantity of layers may be (e.g., remain) the same across the first transmission occasion 350 and the second transmission occasion 355. That is, a precoder for the L0 layers (e.g., for the L0 spatial layers) for the second uplink message 335 scheduled during the second transmission occasion 355 may remain the same across the first transmission occasion 350 and the second transmission occasion 355. In such examples, the network entity 305 and the UE 315 may select a subset of DMRS ports (e.g., L0 DMRS ports) from the first quantity of DMRS ports (e.g., from the L DMRS ports) used during the first transmission occasion 350 to bundled with the second quantity of DMRS ports (e.g., the L0 DMRS ports) of the second transmission occasion 355. For example, the network entity 305 and the UE 315 may select a first L0 ports of the L DMRS ports used during the first transmission occasion 350 to bundled with the L0 ports of the second transmission occasion 355, such that a same quantity of DMRS ports may be used (e.g., bundled) for the first transmission occasion 350 and the second transmission occasion 355. The selected subset of DMRS ports for the first transmission occasion may include one or more of the same DMRS ports as the L0 DMRS ports used during the second transmission occasion.

As illustrated in the example of FIG. 3, one or more techniques for DMRS bundling across a subset of DMRS ports, as described herein, may provide the UE 315 and the network entity 305 with a framework for selecting a subset of DMRS ports to bundle over the first transmission occasions 350 and the second transmission occasion 355. For example, the UE 315 may receive a control message 325 from the network entity 305 that indicates a set of DMRS ports (e.g., L DMRS ports) for DMRS communication between the UE 315 and the network entity 305. The set of DMRS ports may be used to communicate a set of DMRSs between the network entity 305 over the first transmission occasion 350 and a second transmission occasions 355. That is, the UE 315 may use the set of DMRS ports to transmit a first one or more DMRSs to the network entity 305 via the first uplink message 330 during the first transmission occasion 350 and a second one or more DMRSs to the network entity 305 via the second uplink message 335 during the second transmission occasion 355. In some examples, the UE 315 may use DMRS port selection 340-*a* to select a subset of DMRS ports from the set of DMRS ports. The subset of DMRS ports may have fewer DMRS ports than the set of DMRS ports. For example, the subset of DMRS ports may include the L0 DMRS ports selected from the L DMRS ports. The UE 315 may maintain a power condition and a phase continuity condition for the subset of DMRS ports across the first transmission occasion 350 and the second transmission occasion 355. Additionally, or alternatively, the network entity 305 may use DMRS port selection 340-*b* to select a subset of DMRS ports from the set of DMRS ports for DMRS bundling across the first transmission occasion 350 and the second transmission occasion 355. For example, the network entity 305 may select the subset of DMRS ports for which the UE 315 may maintain the power condition and the phase continuity condition across the first transmission occasion 350 and the second transmission occasion 355.

The network entity 305 may receive a portion of the set of DMRSs across the first transmission occasion 350 (e.g., via the first uplink message 330) and the second transmission occasion 355 (e.g., via the second uplink message 335). The portion of the set of DMRSs may correspond to (e.g., be transmitted at the UE 315 using) the subset of DMRS ports. Accordingly, the portion of the set of DMRSs may satisfy the power condition and the phase continuity condition for DMRS bundling. In such examples, the network entity 305 may use channel estimation 345 to estimate a property of a channel for wireless communications between the UE 315 and the network entity 305 using the portion of the set of DMRSs. In some examples, DMRS bundling using the subset of the set of DMRS ports may improve the channel estimation 345, among other benefits.

Figure 4A:
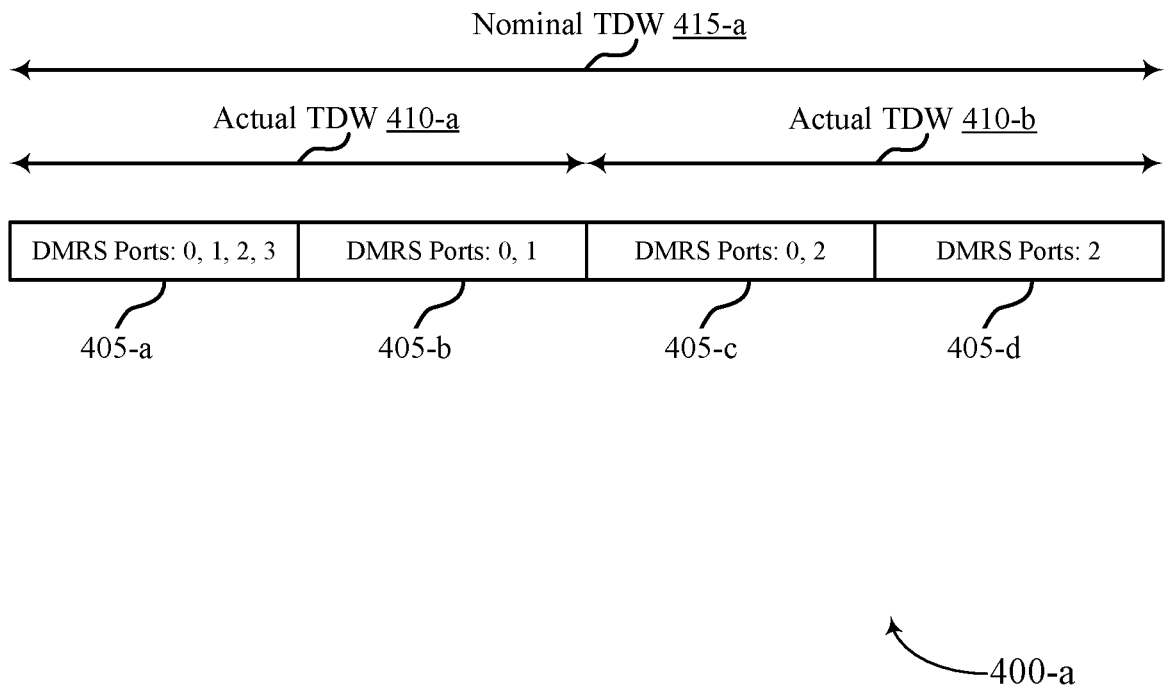
FIGS. 4A and 4B each show an example of a time domain window (TDW) diagram that supports DMRS bundling across a subset of DMRS ports in accordance with one or more aspects of the present disclosure.
Figure 4B:
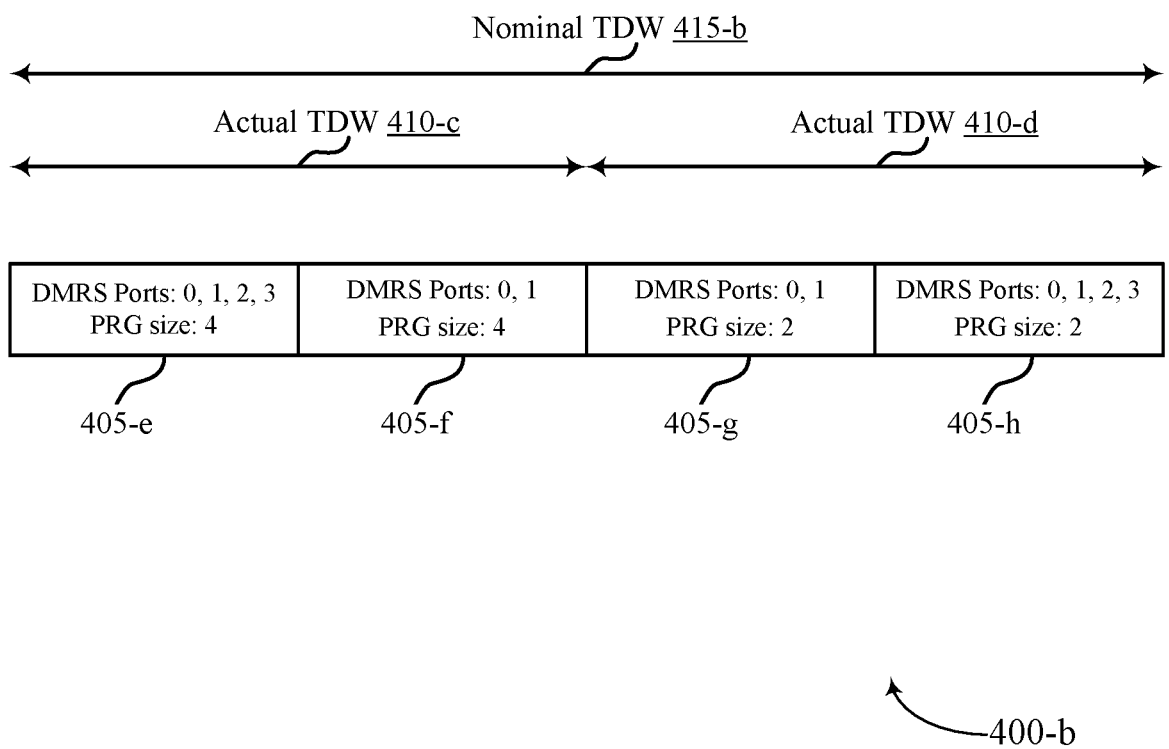

FIGS. 4A and 4B each show an example of a TDW diagram 400 that supports DMRS bundling across a subset of DMRS ports in accordance with one or more aspects of the present disclosure. The TDW diagrams 400 (e.g., a TDW diagram 400-*a*, a TDW diagram 400-*b*) may implement or be implemented at one or more aspects of the wireless communications system 100, the wireless communications system 200, and the wireless communications system 300. For example, the TDW diagrams 400 may be implemented at a UE and a network entity, which may be examples of the corresponding devices illustrated by and described with reference to FIGS. 1 through 3.

In some examples, the network entity or the UE, or both, may perform DMRS bundling across multiple transmission occasion. For example, the network entity or the UE may be configured to bundle multiple DMRSs across multiple transmission occasions (e.g., slots) in which a power condition and a phase continuity condition may be satisfied (e.g., power consistency and phase continuity may be maintained). In some examples, the UE or the network entity may be configured with a nominal TDW (e.g., a nominal TDW 415-*a*, a nominal TDW 415-*b*) for DMRS bundling that may include multiple transmission occasions. The nominal TDW 415-*a* may include a transmission occasion 405-*a*, a transmission occasion 405-*b*, a transmission occasion 405-*c*, and a transmission occasion 405-*d*. The nominal TDW 415-*b* may include a transmission occasion 405-*e*, a transmission occasion 405-*f*, a transmission occasion 405-*g*, and a transmission occasion 405-*g*.

In some examples, however, one or more events (e.g., conditions) may disrupt power consistency and phase continuity across the nominal TDWs 415. That is, one or more events may lead to (e.g., result in, cause) a failure in power consistency and phase continuity being maintained across the nominal TDWs 415. In such examples, the network entity or the UE may partition the nominal TDWs 415 into one or more (smaller) actual TDWs 410 in which the power condition and the phase continuity condition may be satisfied.

As illustrated in the example of FIG. 4A, one factor or condition that may cause power consistency and phase continuity to fail to be maintained (e.g., and lead to partitioning of the nominal TDW 415-*a* into one or more of the actual TDWs 410) may be a quantity of DMRS ports. That is, a change in which DMRS ports are used during each transmission occasion or a quantity of DMRS ports used during each transmission occasion may lead to power consistency and phase continuity to fail to be maintained. For example, a first transmission (e.g., of an uplink message or a downlink message that includes one or more DMRSs) with DMRS ports 0, 1, 2, and 3 may be scheduled during the transmission occasion 405-*a*. A second communication (e.g., of an uplink message or a downlink message that includes one or more DMRSs) with DMRS ports 0, 1 may be scheduled during the transmission occasion 405-*b*. A third communication (e.g., of an uplink message or a downlink message that includes one or more DMRSs) with DMRS ports 0, 2 may be scheduled during the transmission occasion 405-*c*. A fourth communication (e.g., of an uplink message or a downlink message that includes one or more DMRSs) with DMRS port 2 may be scheduled during the transmission occasion 405-*d*. That is, multiple (e.g., different) quantities of DMRS ports may be used across the transmission occasions 405 included in the nominal TDW 415-*a*. In other words, for some of the transmission occasions 405 included in the nominal TDW 415-a (e.g., some PDSCH occasions, some PUSCH occasions) one or more DMRS ports may be unused. For example, one or more DMRS ports scheduled across the transmission occasions 405 included in the nominal TDW 415-a may be unused during one or more of the transmission occasions 405.

In some examples, such as for rate splitting, some transmission occasions may use DMRS ports for a common message, while DMRS ports for a private message may be unused. In such examples, the network entity or the UE may select a subset of DMRS ports that may be used across the multiple transmissions (e.g., the DMRS ports for the common message). That is, DMRS ports within a bundle (e.g., a DMRS bundle) may be used in the multiple transmission occasions (e.g., each transmission occasion). In other words, the UE and the network entity may exclude (e.g., from the subset of DMRS ports) one or more DMRS ports of the set of DMRS ports that may be unused for DMRS communication between the UE and the network entity during at least one transmission occasion of the multiple transmission occasions (e.g., may exclude the DMRS Ports for the private message).

In the example of FIG. 4A, the UE or the network entity may determine to partition the nominal TDW 415-a into an actual TDW 410-a and an actual TDW 410-b. The actual TDW 410-a may include the transmission occasion 405-a and the transmission occasion 405-b. Accordingly, the UE or the network entity may select a subset of DMRS ports to bundle across the actual TDW 410-a that includes DMRS ports common to the transmission occasion 405-a and the transmission occasion 405-b. For example, the UE and the network entity may select DMRS port 0 and DMRS port 1 (e.g., DMRSs transmitted using DMRS port 0 and DMRS port 1) for DMRS bundling across the actual TDW 410-a. Additionally, the actual TDW 410-b may include the transmission occasion 405-c and the transmission occasion 405-d. Accordingly, the UE and the network entity may select a subset of DMRS ports to bundle across the actual TDW 410-b that includes DMRS ports common to the transmission occasion 405-c and the transmission occasion 405-d. For example, the UE and the network entity may select DMRS port 2 (e.g., DMRSs transmitted using DMRS port 2) for DMRS bundling across the actual TDW 410-b. That is, in some examples, DMRS ports (e.g., DMRS port numbers) included in the subset of DMRS ports may change across the nominal TDW 415-a. In such examples, the UE or the network entity may determine the actual TDW 410-a and the actual TDW 410-b, such that the DMRS ports (e.g., the DMRS port numbers) across multiple (e.g., different) transmission occasions (e.g., within the actual TDW 410-a and the actual TDW 410-b) may be the same for the subset of DMRS ports.

Additionally, or alternatively, as illustrated in the example of FIG. 4B, another factor or condition that may cause power consistency and phase continuity to fail to be maintained (e.g., and lead to partitioning of the nominal TDW 415-b into one or more of the actual TDWs 410) may be a PRG size. For example, the UE or the network entity may be configured to use DMRS bundling for a subset of DMRS ports (e.g., DMRS port 0 and DMRS port 1, which may be common to the transmission occasions 405 included in the nominal TDW 415-b). In some examples, a first communication (e.g., of an uplink message or a downlink message that includes one or more DMRSs) with a PRG size of 4 may be scheduled during the transmission occasion 405-c. A second communication (e.g., of an uplink message or a downlink message that includes one or more DMRSs) with a PRG size of 4 may be scheduled during the transmission occasion 405-f. A third communication (e.g., of an uplink message or a downlink message that includes one or more DMRSs) with a PRG size of 2 may be scheduled during the transmission occasion 405-g. A fourth communication (e.g., of an uplink message or a downlink message that includes one or more DMRSs) with a PRG size of 2 may be scheduled during the transmission occasion 405-h. The UE or the network entity may determine to partition the nominal TDW 415-b into an actual TDW 410-c and an actual TDW 410-d, such that the PRG size may be the same across multiple (e.g., different) transmission occasions for the subset of DMRS ports. For example, the transmission occasion 405-e and the transmission occasion 405-f may be associated with a PRG size of 4 and, as such, the actual TDW 410-c may include the transmission occasion 405-e and the transmission occasion 405-f. Additionally, the transmission occasion 405-g and the transmission occasion 405-h may be associated with a PRG size of 2 and, as such, the actual TDW 410-d may include the transmission occasion 405-g and the transmission occasion 405-h. That is, in some examples, the PRG size (e.g., for PDSCH transmissions) may change across the nominal TDW 415-b. In such examples, the UE or the network entity may determine the actual TDW 410-c and the actual TDW 410-d, such that the PRG size may be the same across multiple (e.g., different) transmission occasions (e.g., within the actual TDW 410-c and the actual TDW 410-d) for a subset of DMRS ports. In some examples, other conditions that may lead to power consistency and phase continuity to fail to be maintained may include a resource block allocation, a power, a power control parameter, a timing advance value, a beam, one or more intervening downlink measurements, downlink monitoring, downlink reception, uplink monitoring, uplink reception, or a gap between transmission occasions, among other examples. In some examples, determining an actual TDW based on one or more conditions may lead to improved channel estimation, among other benefits.

Figure 5:
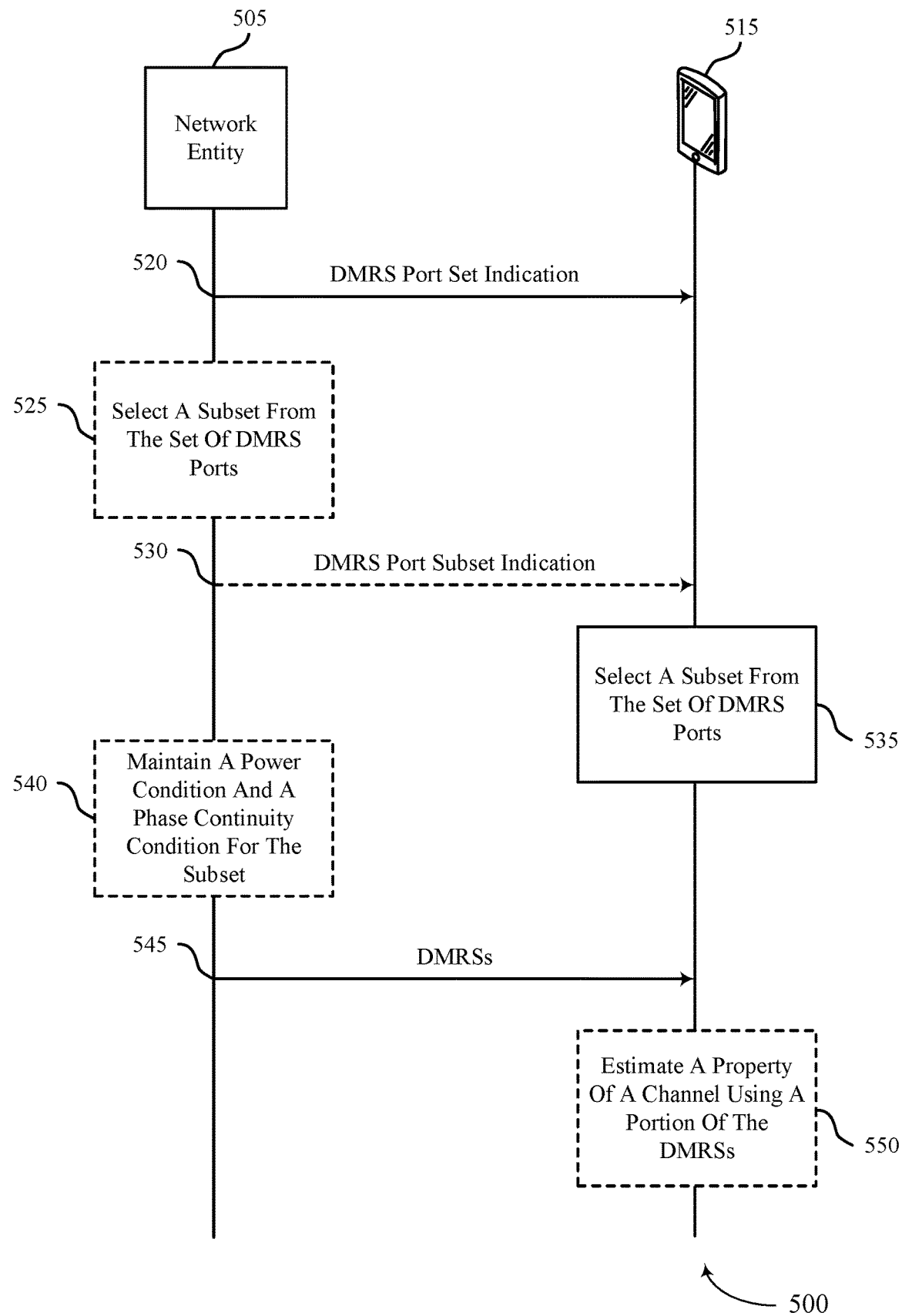
FIGS. 5 and 6 each show an example of a process flow that supports DMRS bundling across a subset of DMRS ports in accordance with one or more aspects of the present disclosure.

FIG. 5 shows an example of a process flow 500 that supports DMRS bundling across a subset of DMRS ports in accordance with one or more aspects of the present disclosure. The process flow 500 may implement or be implemented at one or more aspects of the wireless communications system 100, the wireless communications system 200, the wireless communications system 300, and the TDW diagrams 400. For example, the process flow 500 may be implemented at a UE 515 and a network entity 505, which may be an example of the corresponding devices illustrated by and described with reference to FIGS. 1 through 3, 4A, and 4B. The operations performed at the UE 515 and the network entity 505 may support improvements to communications between the UE 515 and the network entity 505, among other benefits. In the following description of the process flow 500, the operations performed at the UE 515 and the network entity 505 may occur in a different order than the example order shown. Additionally, the operations performed at the UE 515 and the network entity 505 may be performed at different times. Some operations may be combined and some operations may be omitted.

As illustrated in the example of FIG. 5, the UE 515 and the network entity 505 may support a framework for selecting a subset of DMRS ports to bundle over multiple transmission occasions. In other words, a subset of DMRS ports may be bundled at the UE 515 or the network entity 505, or both, over multiple transmission occasions. In some examples, such as for the subset of DMRS ports (e.g., for each DMRS port in the subset), power consistency and phase continuity may be maintained over the multiple transmission occasions.

At 520, the UE 515 may receive a DMRS port set indication from the network entity 505. The DMRS port set indication may be an example of a control message illustrated by and described with reference to FIGS. 2 and 3. For example, the DMRS port set indication may indicate (e.g., configure) a set of DMRS ports for DMRS communication between the UE 515 and the network entity 505.

In some examples, at 525, the network entity 505 may select a subset of DMRS ports from the set of DMRS ports for DMRS bundling across multiple transmission occasions. The network entity 505 may select a portion of the set of DMRS ports to include in the subset of DMRS ports such that the subset of DMRS ports may have fewer DMRS ports than the set of DMRS ports. That is, one or more DMRS ports configured at the UE 515 or the network entity 505 (e.g., DMRS ports outside of the subset) may not be bundled over the multiple transmission occasions. In other words, the network entity 505 (or the UE 515) may refrain from bundling DMRS ports of the set of DMRS ports that may be excluded from the selected subset of DMRS ports.

At 535, the UE 515 may select the subset of DMRS ports from the set of DMRS ports for DMRS bundling across multiple transmission occasions. For example, the UE 515 may select the subset of DMRS ports for DMRS bunding of DMRSs transmitted via the subset of DMRS ports across the multiple transmission occasions. In some examples, to select the subset of DMRS ports, the UE 515 (or the network entity 505) may exclude (e.g., from the subset of DMRS ports) one or more DMRS ports of the set of DMRS ports that may be unused for DMRS communication between the UE 515 and the network entity 505 during one or more transmission occasions (e.g., of the multiple transmission occasions). In some other examples, the UE 515 (or the network entity 505) may select the subset of DMRS ports from the set of DMRS ports based on a respective order of each DMRS port of the subset of DMRS ports within the set of DMRS ports. For example, the subset of DMRS ports may include a first DMRS port of a downlink message (e.g., a PDSCH) scheduled for transmission during one or more of the multiple transmission occasions. In some examples, the subset may include a first quantity of DMRS ports (e.g., M DMRS ports) of the downlink message. In such examples, a value of M may be indicated to the UE 515 (e.g., via RRC signaling, a MAC-CE, or in a scheduling DCI). In other words, the UE 515 may receive (e.g., from the network entity 505) an indication of a quantity of DMRS ports to be included in the subset of DMRS ports.

In some examples, at 530, the UE 515 may receive a DMRS port subset indication from the network entity 505. The DMRS port subset indication may indicate one or more DMRS ports of the set of DMRS ports to use for DMRS bundling. In such an example, the UE 515 may select the subset based on the indication. That is, the subset of DMRS ports may include the one or more DMRS ports indicated via the DMRS port subset indication. In other words, the subset of DMRS ports may be indicated (e.g., explicitly indicated) to the UE 515. For example, a scheduling DCI that may indicate the set of DMRS ports (e.g., a control message including the DMRS port set indication transmitted at 520) may indicate which DMRS ports of the set of DMRS ports to include in the subset (e.g., may indicate which of the DMRS ports included in the set of DMRS ports belong to the subset).

In some other examples, the UE 515 (or the network entity 505) may select the subset of DMRS ports from the set of DMRS ports based on a code division multiplexing (CDM) group, a codeword, a transmission configuration indicator (TCI) state associated with the subset of DMRS ports (e.g., each DMRS port of the subset of DMRS ports), or any combination thereof. For example, the subset may include DMRS ports associated with a same CDM group (e.g., in a first CDM group). Additionally, or alternatively, the subset may include DMRS ports associated with a same codeword (e.g., a first codeword of the downlink message). In some examples, such as for rate splitting, the subset may include DMRS ports associated with a common codeword. Additionally, or alternatively, the subset may include DMRS ports associated with a same TCI (e.g., a same TCI state). For example, for subscriber data management (SDM), the downlink message (e.g., the PDSCH) may be associated with multiple (e.g., 2) TCI states in which a first group of DMRS ports may be associated with a first TCI state and a second group of DMRS ports may be associated with a second TCI state. In such an example, the subset may include the first group of DMRS ports or the second group of DMRS ports.

In some examples, at 540, the network entity 505 may maintain a power condition and a phase continuity condition for the subset of DMRS ports. For example, for downlink transmissions (e.g., including the PDSCH), the network entity 505 may maintain power consistency and phase continuity (e.g., for the subset of DMRS ports) and the UE 515 may perform joint channel estimation (e.g., for each DMRS port in the subset) over the multiple transmission occasions. In some examples, the multiple transmission occasions (e.g., an actual TDW, a nominal TDW) may include multiple PDSCH repetitions (e.g., of a same transport block), multiple PDSCHs (e.g., of different transport blocks), a PDSCH and another downlink channel (e.g., a PDCCH), or any combination thereof. In other words, the multiple transmission occasions, which may correspond to an actual TDW or a nominal TDW, may include repetitions of a same transport block transmitted via the PDSCH, multiple transmissions of multiple (e.g., different) transport blocks via the PDSCH, a transmission of a transport block via the PDSCH and another transport block via another downlink channel (e.g., via the PDCCH), or any combination thereof. The actual TDW and the nominal TDW may be examples of the corresponding TDW illustrated by and described with reference to FIGS. 4A and 4B.

The network entity 505 may use the set of DMRS ports to communicate multiple DMRSs between the UE 515 and the network entity 505. In some examples, a portion of the DMRSs may correspond to the subset of DMRS ports and may satisfy the power condition and the phase continuity condition for DMRS bundling. For example, the portion of the DMRSs that correspond to the subset of DMRS ports may satisfy the power condition and the phase continuity condition based on the network entity 505 maintaining the power condition (e.g., power consistency) and the phase continuity condition for the subset of DMRS ports across the multiple transmission occasions.

At 545, the UE 515 may receive at least the portion of the DMRSs across the multiple transmission occasions. In some examples, the UE 515 may use the portion of the DMRSs for channel estimation. That is, the network entity 505 may maintain power consistency and phase continuity for the subset of DMRS ports over the multiple transmission occasions and the UE 515 may perform joint channel estimation for the subset of DMRS ports (e.g., for each DMRS port in the subset or the set of DMRS ports) over the multiple transmission occasions.

For example, at 550, the UE 515 may estimate a property of a channel for wireless communications between the UE 515 and the network entity 505 using the portion of the DMRSs. In such examples, the property of the channel may be jointly estimated for each DMRS port of the subset of DMRS ports (or the set of DMRS ports) based on DMRS bundling across the multiple transmission occasions. That is, the UE 515 may bundle (e.g., jointly process) the portion of the DMRSs transmitted via the subset of DMRSs to estimate (e.g., jointly estimate) the property of the channel for the subset of DMRS ports (or the set of DMRS ports). In some examples, using DMRSs transmitted via the subset of DMRS ports to estimate a property of the channel for wireless communications between the UE 515 and the network entity 505 may lead to increased accuracy associated with the estimated property, among other benefits.

Figure 6:
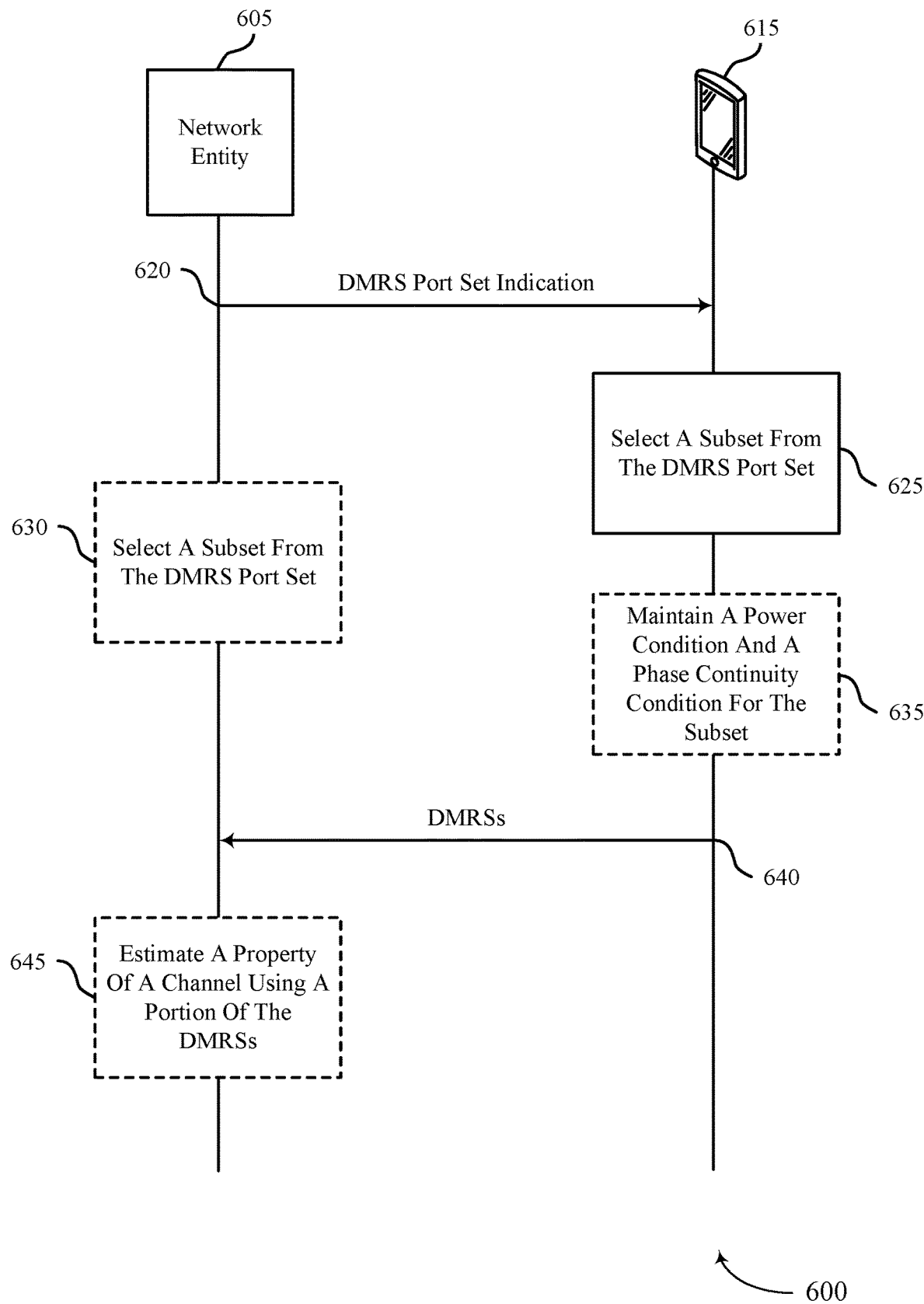

FIG. 6 shows an example of a process flow 600 that supports DMRS bundling across a subset of DMRS ports in accordance with one or more aspects of the present disclosure. The process flow 600 may implement or be implemented at one or more aspects of the wireless communications system 100, the wireless communications system 200, the wireless communications system 300, the TDW diagrams 400, and the process flow 500. For example, the process flow 600 may be implemented at a UE 615 and a network entity 605, which may be examples of the corresponding devices illustrated by and described with reference to FIGS. 1 through 3, 4A, 4B, and 5. The operations performed at the UE 615 and the network entity 605 may support improvements to communications between the UE 615 and the network entity 605, among other benefits. In the following description of the process flow 600, the operations performed at the UE 615 and the network entity 605 may occur in a different order than the example order shown. Additionally, the operations performed at the UE 615 and the network entity 605 may be performed at different times. Some operations may be combined and some operations may be omitted.

As illustrated in the example of FIG. 6, the UE 615 and the network entity 605 may support a framework for selecting a subset of DMRS ports to bundle over multiple transmission occasions. That is, a subset of DMRS ports may be bundled at the UE 615 and the network entity 605 over multiple transmission occasions. In some examples, such as for each DMRS port in the subset, power consistency and phase continuity may be maintained over the multiple transmission occasions.

At 620, the UE 615 may receive a DMRS port set indication from the network entity 605. The DMRS port set indication (e.g., a control message) may indicate (e.g., configure) a set of DMRS ports for DMRS communication between the UE 615 and the network entity 605.

At 625, the UE 615 may select a subset of DMRS ports from the set of DMRS ports for DMRS bundling across multiple transmission occasions. For example, the UE 615 may select a portion of the set of DMRS ports to use for DMRS bundling, such that the subset of DMRS ports may have fewer DMRS ports than the set of DMRS ports. That is, one or more DMRS ports that may be configured at the UE 615 (or the network entity 605) may be excluded from DMRS bundling over the multiple transmission occasions.

In some examples, at 630, the network entity 605 may select a subset of DMRS ports from the set of DMRS ports for DMRS bundling across multiple transmission occasions, to select the subset of DMRS ports, the network entity 605 or the UE 615 may exclude (e.g., from the subset of DMRS ports) one or more DMRS ports of the set of DMRS ports that may be unused for DMRS communication between the UE 615 and the network entity 605 during one or more transmission occasions (e.g., of the multiple transmission occasions). In some other examples, the UE 615 or the network entity 605 may select the subset of DMRS ports from the set of DMRS ports based on a respective order of each DMRS port of the subset of DMRS ports within the set of DMRS ports. For example, the subset may include a first DMRS port of an uplink message (e.g., a PUSCH). In some examples, the subset may include a first quantity of DMRS ports (e.g., M DMRS ports) of the uplink message (e.g., the PUSCH). In such examples, a value of M may be indicated to the UE 615 (e.g., via RRC signaling, a MAC-CE, or in a scheduling DCI). In other words, the UE 615 may receive an indication (e.g., from the network entity 605) of a quantity of DMRS ports to be included in the subset of DMRS ports.

In some examples, the subset of DMRS ports may be indicated (e.g., explicitly indicated) to the UE 615. For example, a scheduling DCI that may indicate the set of DMRS ports (e.g., a control message including the DMRS port set indication) may indicate which DMRS ports of the set of DMRS ports to include in the subset of DMRS ports. In some other examples, the UE 615 or the network entity 605 may select the subset of DMRS ports from the set of DMRS ports based on a CDM group, a codeword, a TCI state (e.g., a respective TCI state associated with each DMRS port of the subset of DMRS ports), or any combination thereof. For example, the subset of DMRS ports may include DMRS ports associated with a same CDM group (e.g., in a first CDM group). Additionally, or alternatively, the subset of DMRS ports may include DMRS ports associated with a same codeword (e.g., a first codeword of the PUSCH). In some examples, the subset of DMRS ports may include DMRS ports associated with a same TCI state.

In some examples, at 635, the UE 615 may maintain a power condition and a phase continuity condition for the subset of DMRS ports. For example, for uplink transmissions (e.g., transmission of the PUSCH), the UE 615 may maintain power consistency and phase continuity (e.g., for the subset of DMRS ports) over the multiple transmission occasions and the network entity 605 may perform joint channel estimation (e.g., for each DMRS port in the subset) over the multiple transmission occasions. In some examples, the multiple transmission occasions (an actual TDW, a nominal TDW) may include multiple PUSCH repetitions (e.g., of a same transport block), multiple PUSCHs (e.g., of different transport blocks), a PUSCH and another uplink channel (e.g., a PUCCH), or any combination thereof. That is, the multiple transmission occasions, which may include an actual TDW or a nominal TDW, may include repetitions of a same transport block transmitted via the PUSCH, multiple transmissions of multiple (e.g., different) transport blocks via the PUSCH, a transmission of a transport block via the PUSCH and another transport block via another downlink channel (e.g., via the PUCCH), or any combination thereof. The actual TDW and the nominal TDW may be examples of the corresponding TDW illustrated by and described with reference to FIGS. 4A and 4B.

At 640, the UE 615 may use the set of DMRS ports to communicate multiple DMRSs between the UE 615 and the network entity 605. A portion of the DMRSs (e.g., the DMRSs that correspond to the subset of DMRS ports) may satisfy the power condition and the phase continuity condition for DMRS bundling. For example, the UE 615 may transmit the portion of the DMRSs over the multiple transmission occasions using the subset of DMRS ports and the portion of the DMRSs may satisfy the power condition and the phase continuity condition based on the UE 615 maintaining the power condition (e.g., power consistency) and the phase continuity condition for the subset of DMRS ports over the multiple transmission occasions.

In some examples, at 645, the network entity 605 may estimate a property of a channel for wireless communications between the UE 615 and the network entity 605 using the portion of the DMRSs. In such examples, the property of the channel may be jointly estimated for the subset (or set) of DMRS ports (e.g., each DMRS port of the subset or set of DMRS ports) based on DMRS bundling across the multiple transmission occasions. That is, for uplink transmissions such as via the PUSCH or the PUCCH, the UE 615 may maintain power consistency and phase continuity, and the network entity 605 may perform joint channel estimation for the subset of DMRS ports (e.g., each DMRS port in the subset) over the multiple transmission occasions. In some examples, using the portion of DMRSs to estimate a property of the channel for wireless communications between the UE 615 and the network entity 605 may lead to increased accuracy associated with the estimated property, among other benefits.

Figure 7:
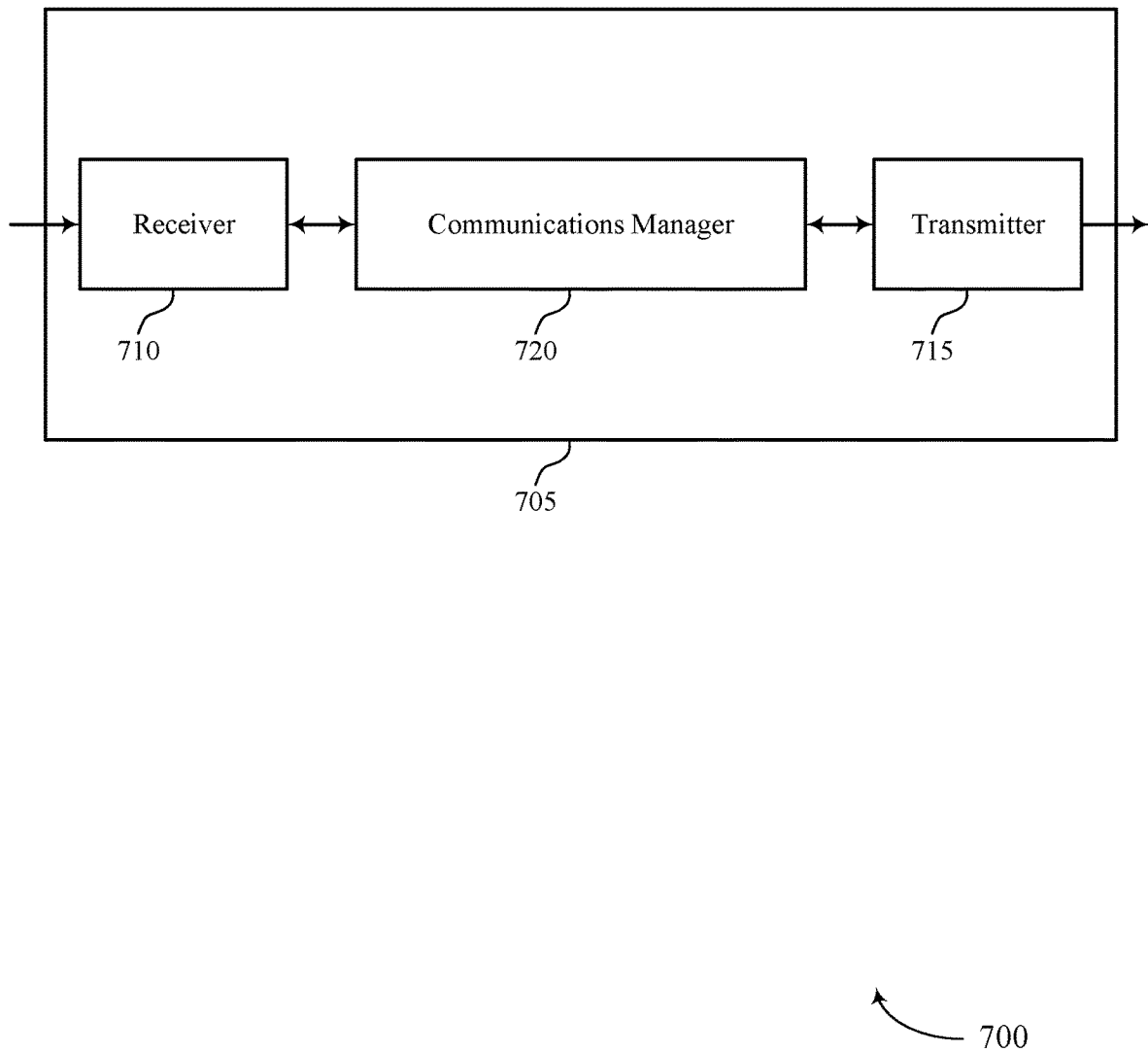
FIGS. 7 and 8 show block diagrams of devices that support DMRS bundling across a subset of DMRS ports in accordance with one or more aspects of the present disclosure.

FIG. 7 shows a block diagram 700 of a device 705 that supports DMRS bundling across a subset of DMRS ports in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to DMRS bundling across a subset of DMRS ports). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to DMRS bundling across a subset of DMRS ports). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of DMRS bundling across a subset of DMRS ports as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE (e.g., the device 705) in accordance with examples as disclosed herein. For example, the communications manager 720 is capable of, configured to, or operable to support a means for receiving a control message that indicates a set of DMRS ports for DMRS communication between the UE and a network entity. The communications manager 720 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The communications manager 720 is capable of, configured to, or operable to support a means for communicating, between the UE and the network entity, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing and more efficient utilization of communication resources.

Figure 8:
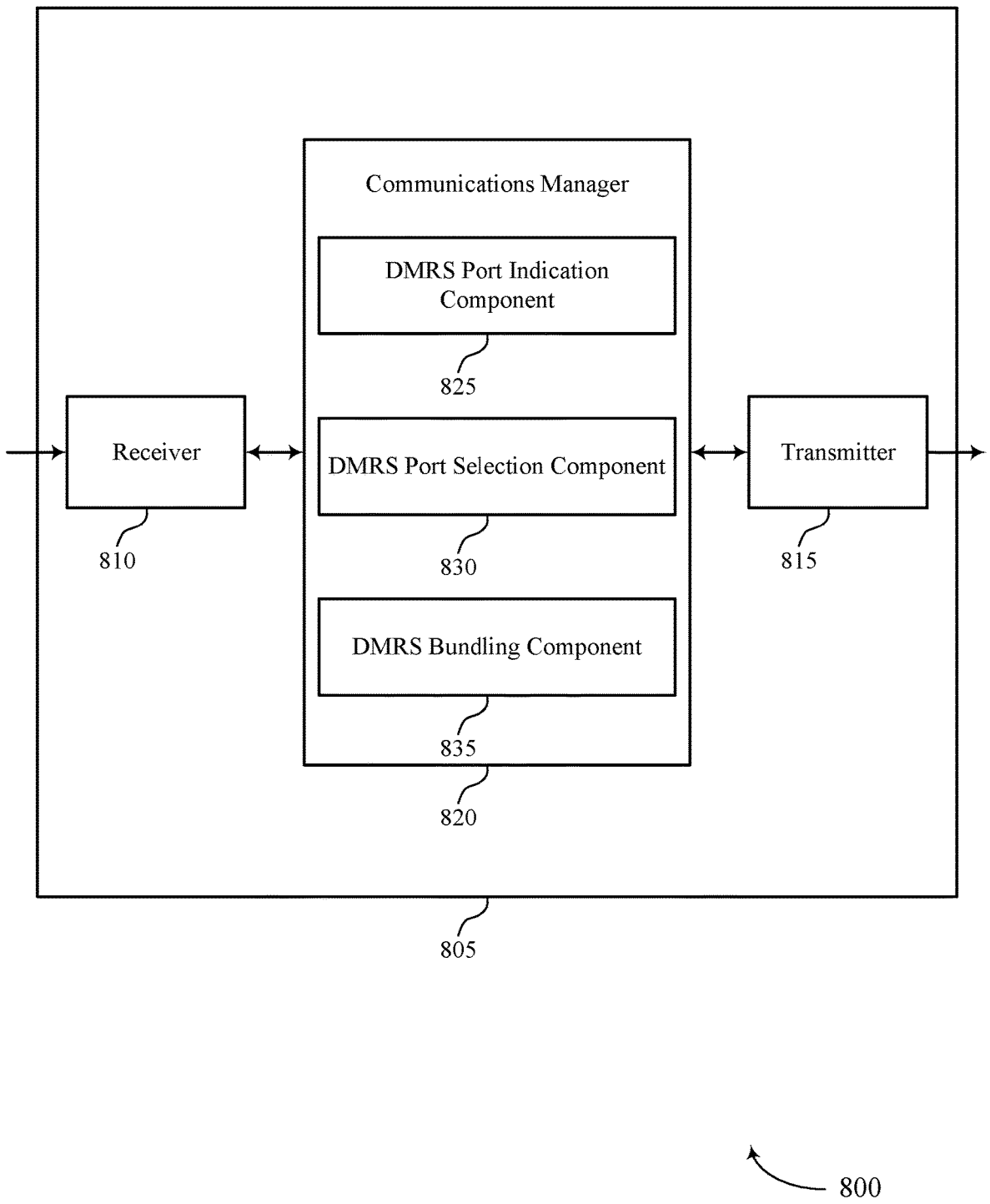

FIG. 8 shows a block diagram 800 of a device 805 that supports DMRS bundling across a subset of DMRS ports in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to DMRS bundling across a subset of DMRS ports). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to DMRS bundling across a subset of DMRS ports). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of DMRS bundling across a subset of DMRS ports as described herein. For example, the communications manager 820 may include a DMRS port indication component 825, a DMRS port selection component 830, a DMRS bundling component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE (e.g., the device 805) in accordance with examples as disclosed herein. The DMRS port indication component 825 is capable of, configured to, or operable to support a means for receiving a control message that indicates a set of DMRS ports for DMRS communication between the UE and a network entity. The DMRS port selection component 830 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The DMRS bundling component 835 is capable of, configured to, or operable to support a means for communicating, between the UE and the network entity, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

Figure 9:
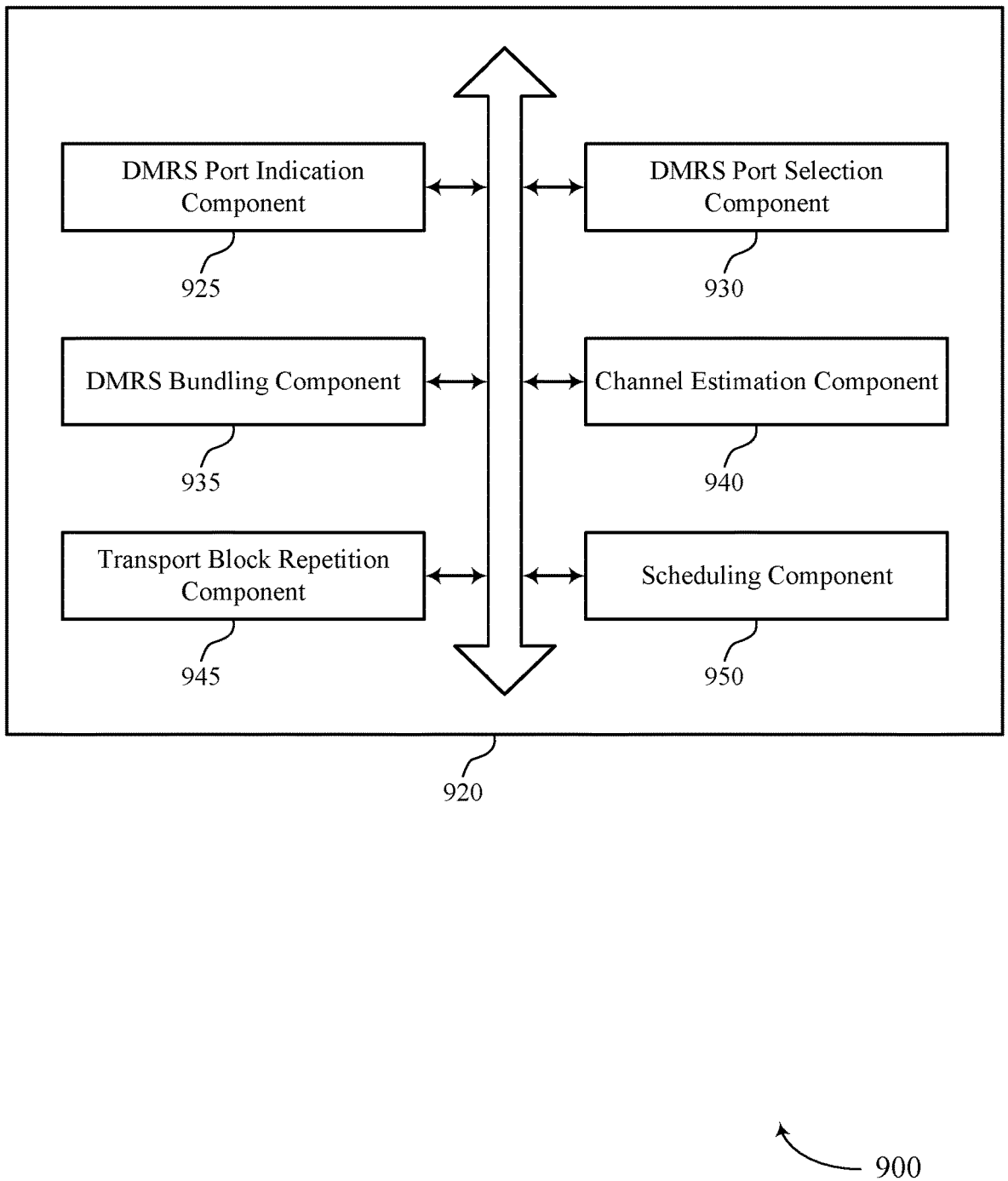
FIG. 9 shows a block diagram of a communications manager that supports DMRS bundling across a subset of DMRS ports in accordance with one or more aspects of the present disclosure.

FIG. 9 shows a block diagram 900 of a communications manager 920 that supports DMRS bundling across a subset of DMRS ports in accordance with one or more aspects of the present disclosure. The communications manager 920 may be an example of aspects of a communications manager 720, a communications manager 820, or both, as described herein. The communications manager 920, or various components thereof, may be an example of means for performing various aspects of DMRS bundling across a subset of DMRS ports as described herein. For example, the communications manager 920 may include a DMRS port indication component 925, a DMRS port selection component 930, a DMRS bundling component 935, a channel estimation component 940, a transport block repetition component 945, a scheduling component 950, or any combination thereof. Each of these components may communicate, directly or indirectly, with one another (e.g., via one or more buses).

The communications manager 920 may support wireless communications at a UE in accordance with examples as disclosed herein. The DMRS port indication component 925 is capable of, configured to, or operable to support a means for receiving a control message that indicates a set of DMRS ports for DMRS communication between the UE and a network entity. The DMRS port selection component 930 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The DMRS bundling component 935 is capable of, configured to, or operable to support a means for communicating, between the UE and the network entity, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

In some examples, to support communicating the set of multiple DMRSs, the DMRS bundling component 935 is capable of, configured to, or operable to support a means for receiving at least the portion of the set of multiple DMRSs across the set of multiple transmission occasions. In some examples, to support communicating the set of multiple DMRSs, the channel estimation component 940 is capable of, configured to, or operable to support a means for estimating a property of a channel for wireless communications between the UE and the network entity using the portion of the set of multiple DMRSs, where the property of the channel is jointly estimated for each DMRS port of the set of DMRS ports based on DMRS bundling across the set of multiple transmission occasions.

In some examples, to support communicating the set of multiple DMRSs, the DMRS bundling component 935 is capable of, configured to, or operable to support a means for transmitting the portion of the set of multiple DMRSs over the set of multiple transmission occasions using the subset of DMRS ports, where the portion of the set of multiple DMRSs satisfies the power condition and the phase continuity condition based on the UE maintaining the power condition and the phase continuity condition for the subset of DMRS ports over the set of multiple transmission occasions.

In some examples, the transport block repetition component 945 is capable of, configured to, or operable to support a means for receiving a second control message that schedules a set of multiple repetitions of a transport block during the set of multiple transmission occasions, each repetition of the set of multiple repetitions corresponding to a respective transmission occasion of the set of multiple transmission occasions.

In some examples, the scheduling component 950 is capable of, configured to, or operable to support a means for receiving one or more control messages that schedule communication of a set of multiple transport blocks during the set of multiple transmission occasions, each transport block of the set of multiple transport blocks corresponding to a respective transmission occasion of the set of multiple transmission occasions.

In some examples, the scheduling component 950 is capable of, configured to, or operable to support a means for receiving one or more control messages that schedule the set of multiple transmission occasions, the set of multiple transmission occasions including at least one communication via a shared channel and at least one other communication via a control channel.

In some examples, to support selecting the subset of DMRS ports, the DMRS port selection component 930 is capable of, configured to, or operable to support a means for excluding from the subset of DMRS ports one or more DMRS ports of the set of DMRS ports that are unused for DMRS communication between the UE and the network entity during at least one transmission occasion of the set of multiple transmission occasions.

In some examples, to support selecting the subset of DMRS ports, the DMRS port selection component 930 is capable of, configured to, or operable to support a means for selecting the subset of DMRS ports from the set of DMRS ports based on a respective order of each DMRS port of the subset of DMRS ports within the set of DMRS ports.

In some examples, the DMRS port selection component 930 is capable of, configured to, or operable to support a means for receiving an indication of a quantity of DMRS ports to be included in the subset of DMRS ports.

In some examples, the DMRS port indication component 925 is capable of, configured to, or operable to support a means for receiving, from the network entity, an indication of one or more DMRS ports of the set of DMRS ports used for DMRS bundling, where the subset of DMRS ports includes the one or more DMRS ports.

In some examples, to support selecting the subset of DMRS ports, the DMRS port selection component 930 is capable of, configured to, or operable to support a means for selecting the subset of DMRS ports from the set of DMRS ports based on one or more of: a CDM group, a codeword, or a TCI state associated with each DMRS port of the subset of DMRS ports.

In some examples, the subset of DMRS ports includes a same quantity of DMRS ports across the set of multiple transmission occasions. In some examples, the subset of DMRS ports is associated with a same PDG size across the set of multiple transmission occasions. In some examples, the set of DMRS ports is associated with a set of multiple codewords. In some examples, the subset of DMRS ports is associated with a codeword of the set of multiple codewords.

Figure 10:
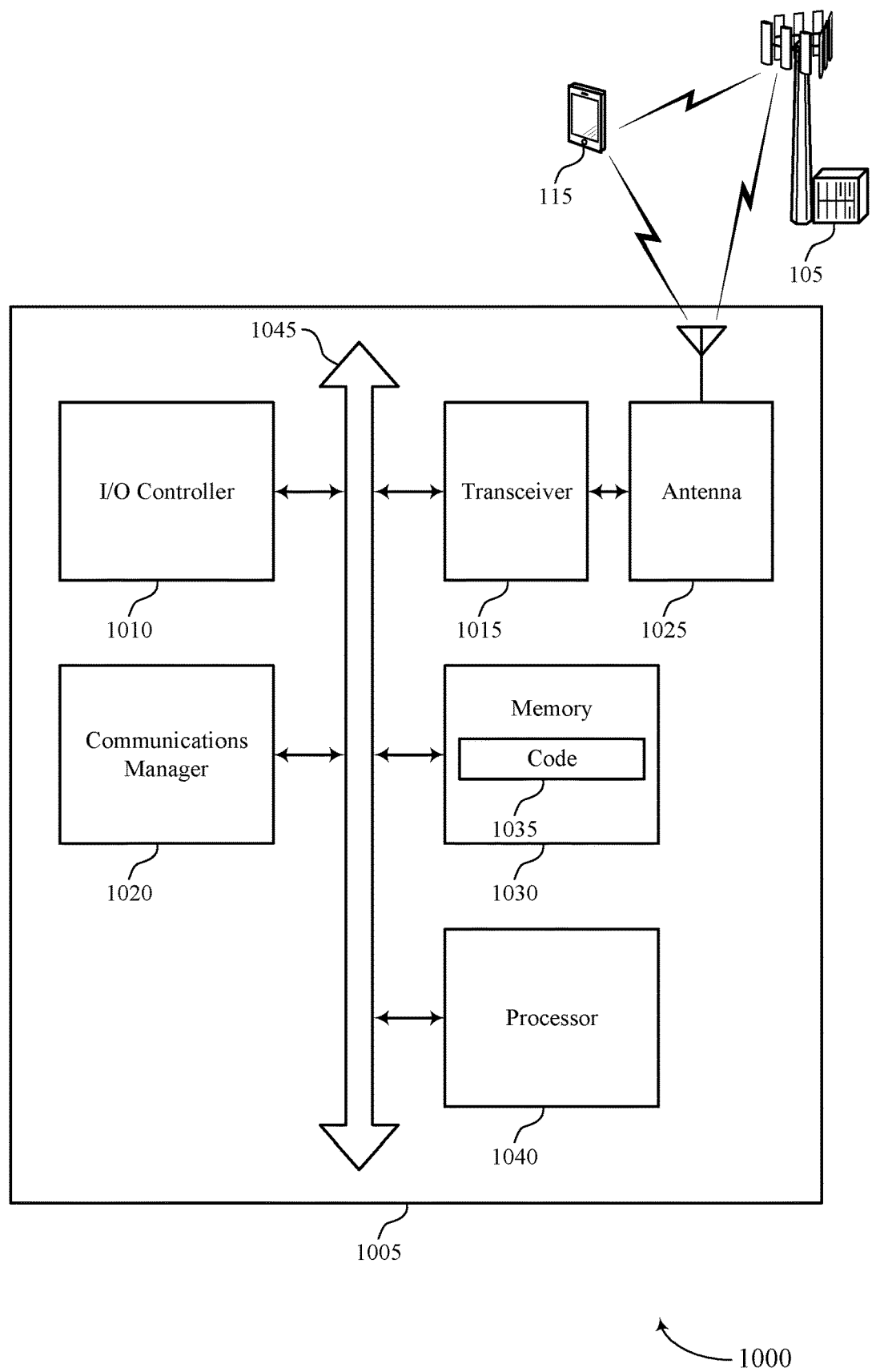
FIG. 10 shows a diagram of a system including a device that supports DMRS bundling across a subset of DMRS ports in accordance with one or more aspects of the present disclosure.

FIG. 10 shows a diagram of a system 1000 including a device 1005 that supports DMRS bundling across a subset of DMRS ports in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting DMRS bundling across a subset of DMRS ports). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE (e.g., the device 1005) in accordance with examples as disclosed herein. For example, the communications manager 1020 is capable of, configured to, or operable to support a means for receiving a control message that indicates a set of DMRS ports for DMRS communication between the UE and a network entity. The communications manager 1020 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The communications manager 1020 is capable of, configured to, or operable to support a means for communicating, between the UE and the network entity, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

By including or configuring the communications manager 1020 in accordance with examples as described herein, the device 1005 may support techniques for improved communication reliability, reduced latency, improved user experience related to reduced processing, and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of DMRS bundling across a subset of DMRS ports as described herein, or the processor 1040 and the memory 1030 may be otherwise configured to perform or support such operations.

Figure 11:
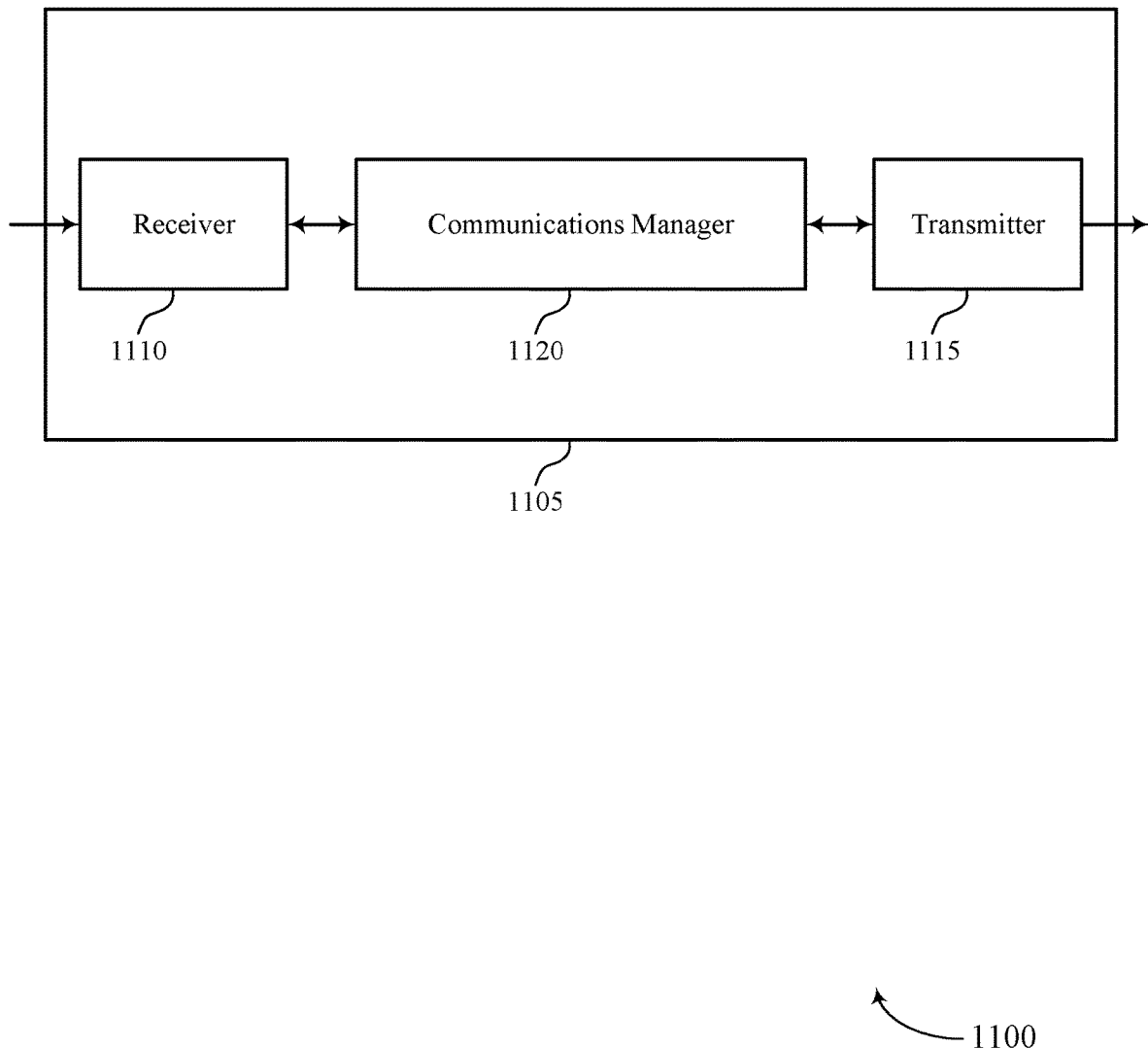
FIGS. 11 and 12 show block diagrams of devices that support DMRS bundling across a subset of DMRS ports in accordance with one or more aspects of the present disclosure.

FIG. 11 shows a block diagram 1100 of a device 1105 that supports DMRS bundling across a subset of DMRS ports in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of DMRS bundling across a subset of DMRS ports as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity (e.g., the device 1105) in accordance with examples as disclosed herein. For example, the communications manager 1120 is capable of, configured to, or operable to support a means for outputting a control message that indicates a set of DMRS ports for DMRS communication between the network entity and a UE. The communications manager 1120 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The communications manager 1120 is capable of, configured to, or operable to support a means for communicating, between the network entity and the UE, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing and more efficient utilization of communication resources.

Figure 12:
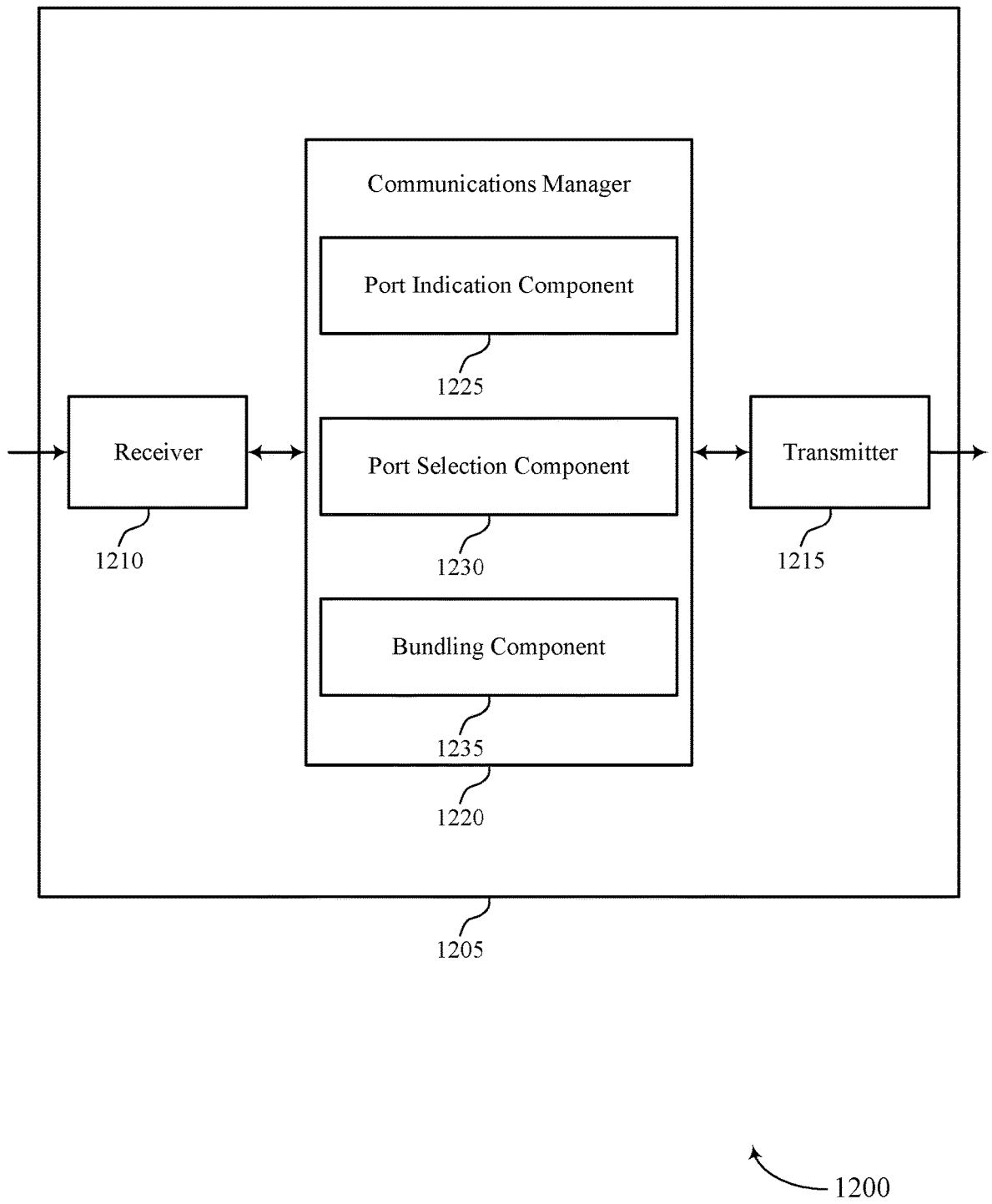

FIG. 12 shows a block diagram 1200 of a device 1205 that supports DMRS bundling across a subset of DMRS ports in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of DMRS bundling across a subset of DMRS ports as described herein. For example, the communications manager 1220 may include a port indication component 1225, a port selection component 1230, a bundling component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity (e.g., the device 1205) in accordance with examples as disclosed herein. The port indication component 1225 is capable of, configured to, or operable to support a means for outputting a control message that indicates a set of DMRS ports for DMRS communication between the network entity and a UE. The port selection component 1230 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The bundling component 1235 is capable of, configured to, or operable to support a means for communicating, between the network entity and the UE, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

Figure 13:
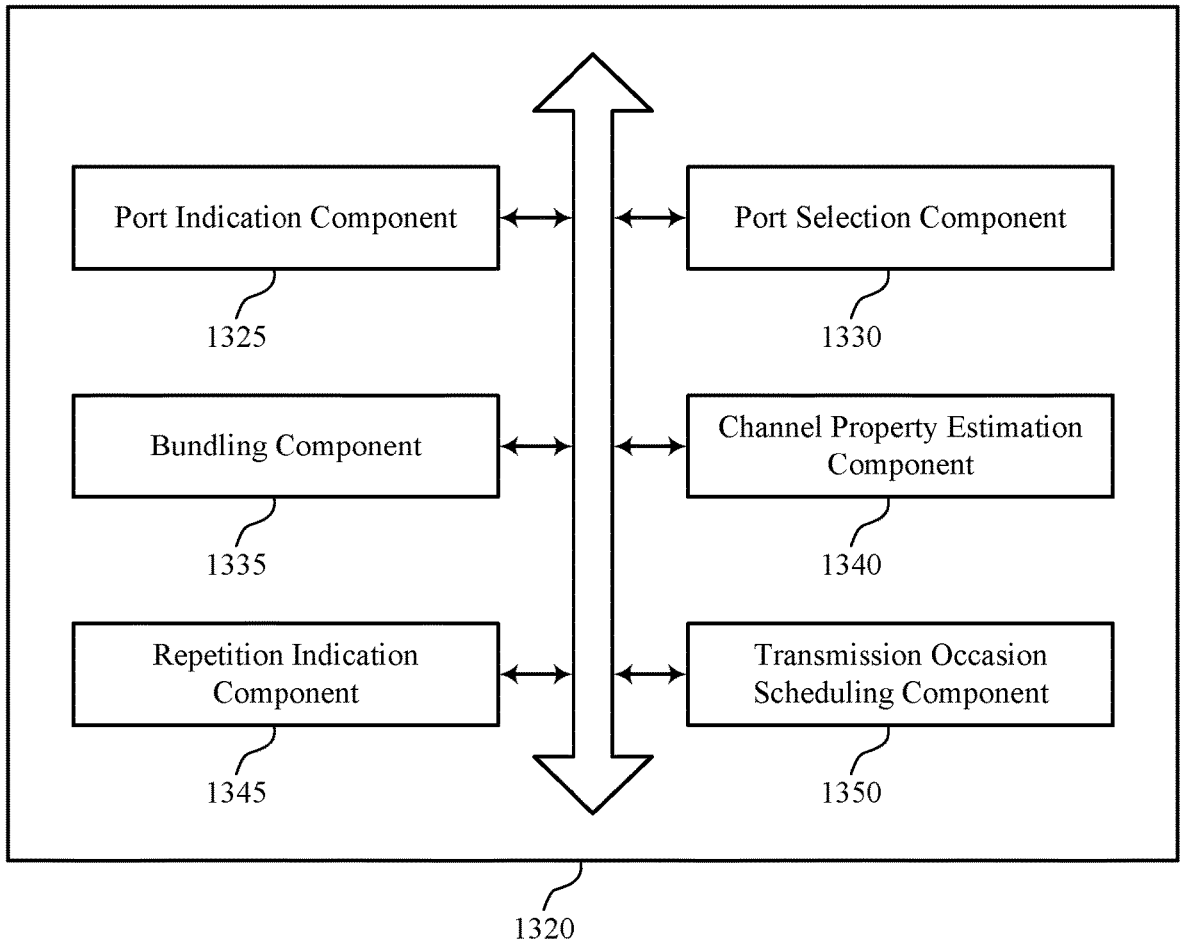
FIG. 13 shows a block diagram of a communications manager that supports DMRS bundling across a subset of DMRS ports in accordance with one or more aspects of the present disclosure.

FIG. 13 shows a block diagram 1300 of a communications manager 1320 that supports DMRS bundling across a subset of DMRS ports in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of DMRS bundling across a subset of DMRS ports as described herein. For example, the communications manager 1320 may include a port indication component 1325, a port selection component 1330, a bundling component 1335, a channel property estimation component 1340, a repetition indication component 1345, a transmission occasion scheduling component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The port indication component 1325 is capable of, configured to, or operable to support a means for outputting a control message that indicates a set of DMRS ports for DMRS communication between the network entity and a UE. The port selection component 1330 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The bundling component 1335 is capable of, configured to, or operable to support a means for communicating, between the network entity and the UE, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

In some examples, to support communicating the set of multiple DMRSs, the bundling component 1335 is capable of, configured to, or operable to support a means for obtaining at least the portion of the set of multiple DMRSs across the set of multiple transmission occasions. In some examples, to support communicating the set of multiple DMRSs, the channel property estimation component 1340 is capable of, configured to, or operable to support a means for estimating a property of a channel for wireless communications between the network entity and the UE using the portion of the set of multiple DMRSs, where the property of the channel is jointly estimated for each DMRS port of the set of DMRS ports based on DMRS bundling across the set of multiple transmission occasions.

In some examples, to support communicating the set of multiple DMRSs, the bundling component 1335 is capable of, configured to, or operable to support a means for outputting the portion of the set of multiple DMRSs over the set of multiple transmission occasions using the subset of DMRS ports, where the portion of the set of multiple DMRSs satisfies the power condition and the phase continuity condition based on the network entity maintaining the power condition and the phase continuity condition for the subset of DMRS ports over the set of multiple transmission occasions.

In some examples, the repetition indication component 1345 is capable of, configured to, or operable to support a means for outputting a second control message that schedules a set of multiple repetitions of a transport block during the set of multiple transmission occasions, each repetition of the set of multiple repetitions corresponding to a respective transmission occasion of the set of multiple transmission occasions.

In some examples, the transmission occasion scheduling component 1350 is capable of, configured to, or operable to support a means for outputting one or more control messages that schedule communication of a set of multiple transport blocks during the set of multiple transmission occasions, each transport block of the set of multiple transport blocks corresponding to a respective transmission occasion of the set of multiple transmission occasions.

In some examples, the transmission occasion scheduling component 1350 is capable of, configured to, or operable to support a means for outputting one or more control messages that schedule the set of multiple transmission occasions, the set of multiple transmission occasions including at least one communication via a shared channel and at least one other communication via a control channel.

In some examples, to support selecting the subset of DMRS ports, the port selection component 1330 is capable of, configured to, or operable to support a means for excluding from the subset of DMRS ports one or more DMRS ports of the set of DMRS ports that are unused for DMRS communication between the UE and the network entity during at least one transmission occasion of the set of multiple transmission occasions.

In some examples, to support selecting the subset of DMRS ports, the port selection component 1330 is capable of, configured to, or operable to support a means for selecting the subset of DMRS ports from the set of DMRS ports based on a respective order of each DMRS port of the subset of DMRS ports within the set of DMRS ports.

In some examples, the port selection component 1330 is capable of, configured to, or operable to support a means for outputting an indication of a quantity of DMRS ports to be included in the subset of DMRS ports. In some examples, the port indication component 1325 is capable of, configured to, or operable to support a means for outputting an indication of one or more DMRS ports of the set of DMRS ports used for DMRS bundling, where the subset of DMRS ports includes the one or more DMRS ports.

In some examples, to support selecting the subset of DMRS ports, the port selection component 1330 is capable of, configured to, or operable to support a means for selecting the subset of DMRS ports from the set of DMRS ports based on one or more of: a CDM group, a codeword, or a TCI state associated with each DMRS port of the subset of DMRS ports.

In some examples, the subset of DMRS ports includes a same quantity of DMRS ports across the set of multiple transmission occasions. In some examples, the subset of DMRS ports is associated with a same PRG size across the set of multiple transmission occasions. In some examples, the set of DMRS ports is associated with a set of multiple codewords. In some examples, the subset of DMRS ports is associated with a codeword of the set of multiple codewords.

Figure 14:
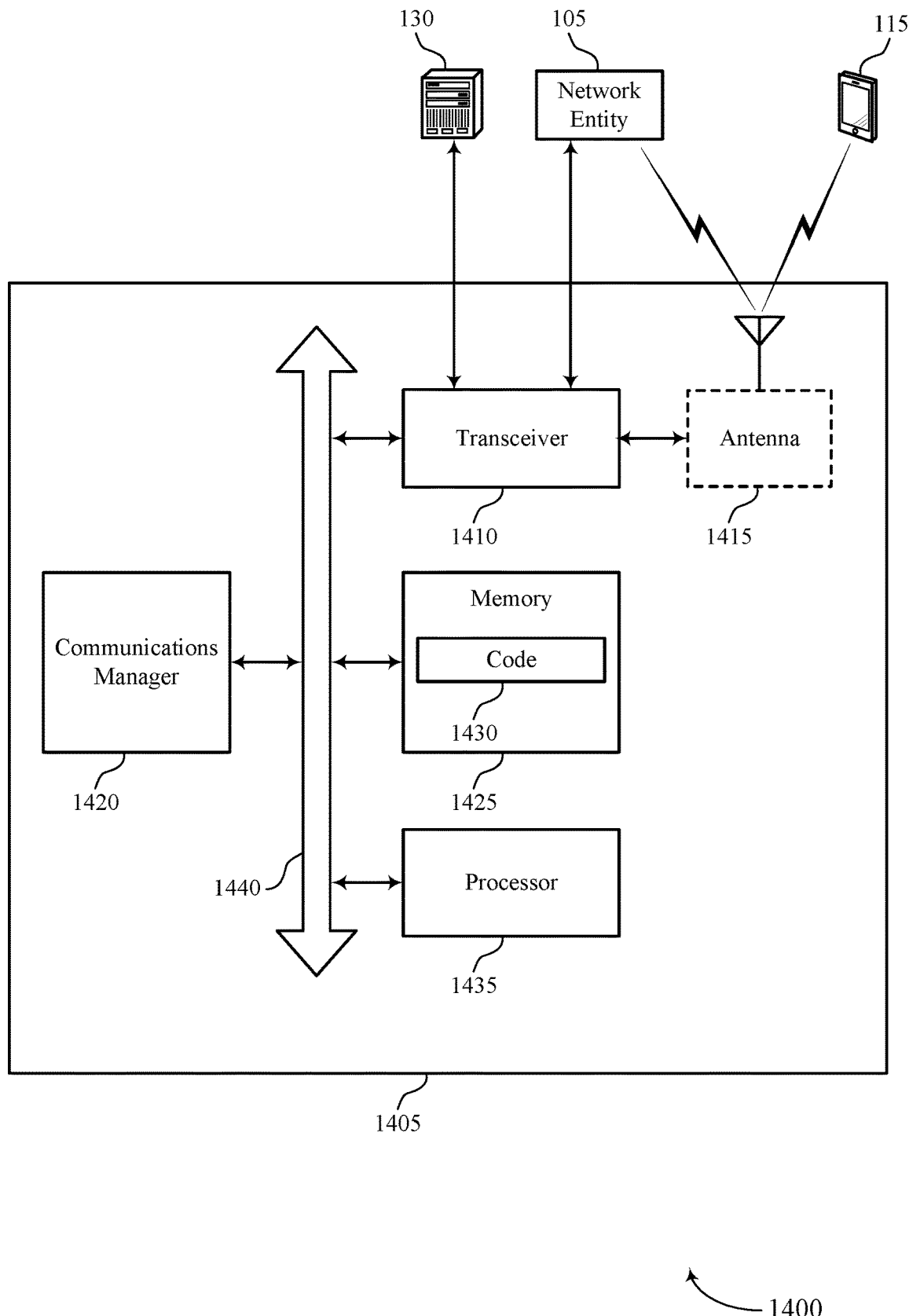
FIG. 14 shows a diagram of a system including a device that supports DMRS bundling across a subset of DMRS ports in accordance with one or more aspects of the present disclosure.

FIG. 14 shows a diagram of a system 1400 including a device 1405 that supports DMRS bundling across a subset of DMRS ports in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting DMRS bundling across a subset of DMRS ports). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an $X_2$ interface within an LTE/LTE-A wireless communications network technology to provide communication between network entities 105.

The communications manager 1420 may support wireless communications at a network entity (e.g., the device 1405) in accordance with examples as disclosed herein. For example, the communications manager 1420 is capable of, configured to, or operable to support a means for outputting a control message that indicates a set of DMRS ports for DMRS communication between the network entity and a UE. The communications manager 1420 is capable of, configured to, or operable to support a means for selecting a subset of DMRS ports from the set of DMRS ports for DMRS bundling across a set of multiple transmission occasions, the subset of DMRS ports having fewer DMRS ports than the set of DMRS ports. The communications manager 1420 is capable of, configured to, or operable to support a means for communicating, between the network entity and the UE, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling.

By including or configuring the communications manager 1420 in accordance with examples as described herein, the device 1405 may support techniques for improved communication reliability, reduced latency, improved user experience related to reduced processing, and more efficient utilization of communication resources.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of DMRS bundling across a subset of DMRS ports as described herein, or the processor 1435 and the memory 1425 may be otherwise configured to perform or support such operations.

Figure 15:
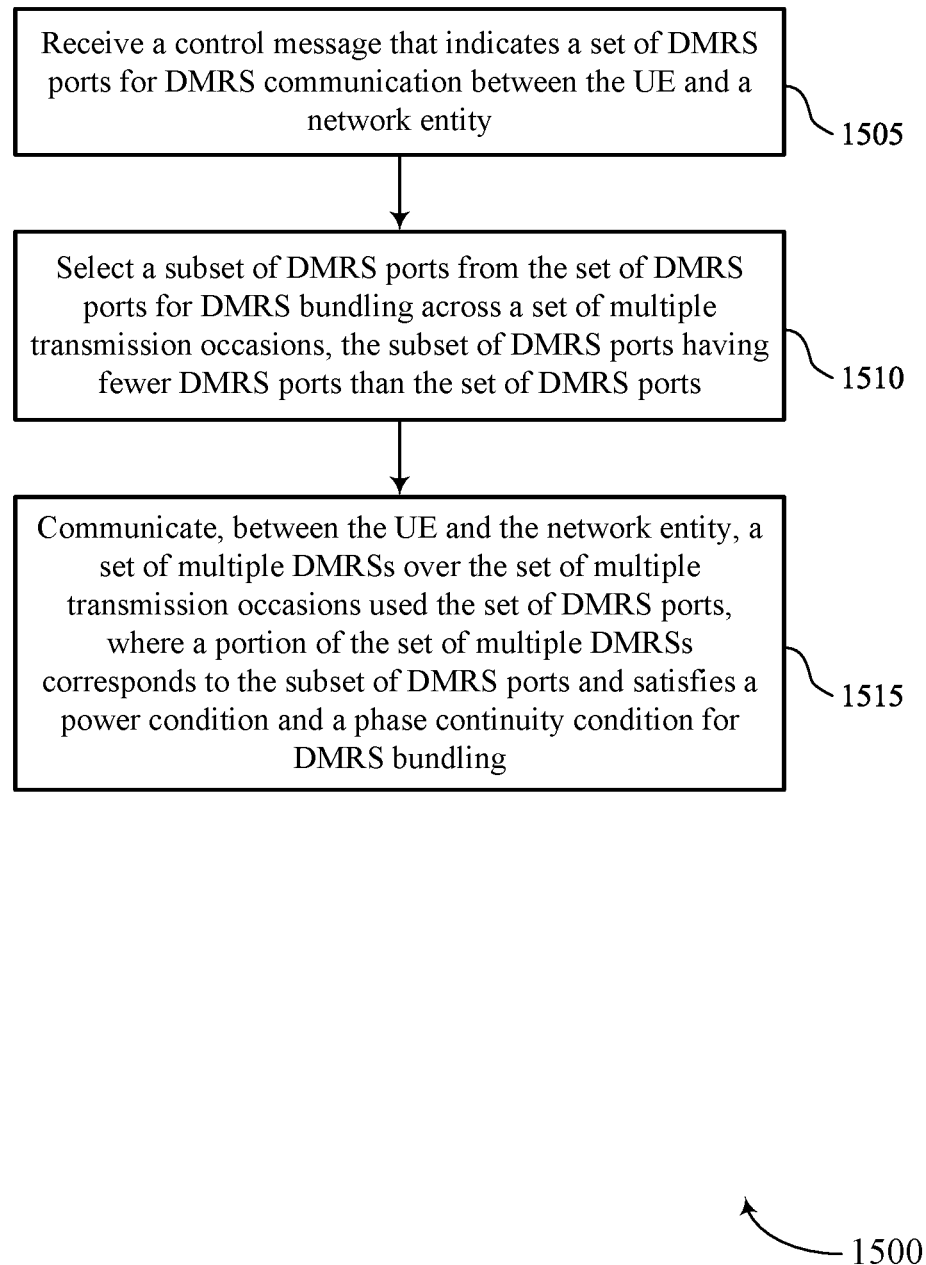
FIGS. 15 through 18 show flowcharts illustrating methods that support DMRS bundling across a subset of DMRS ports in accordance with one or more aspects of the present disclosure.

FIG. 15 shows a flowchart illustrating a method 1500 that supports DMRS bundling across a subset of DMRS ports in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving a control message that indicates a set of DMRS ports for DMRS communication between the UE and a network entity. The operations of 1505 may be performed in accordance with examples as disclosed herein. In some examples, aspects of the operations of 1505 may be performed by a DMRS port indication component 925 as described with reference to FIG. 9.

At 1510, the method may include selecting a subset of DMRS ports from the set of DMRS ports for DMRS bundling across a set of multiple transmission occasions, the subset of DMRS ports having fewer DMRS ports than the set of DMRS ports. The operations of 1510 may be performed in accordance with examples as disclosed herein. In some examples, aspects of the operations of 1510 may be performed by a DMRS port selection component 930 as described with reference to FIG. 9.

At 1515, the method may include communicating, between the UE and the network entity, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling. The operations of 1515 may be performed in accordance with examples as disclosed herein. In some examples, aspects of the operations of 1515 may be performed by a DMRS bundling component 935 as described with reference to FIG. 9.

Figure 16:
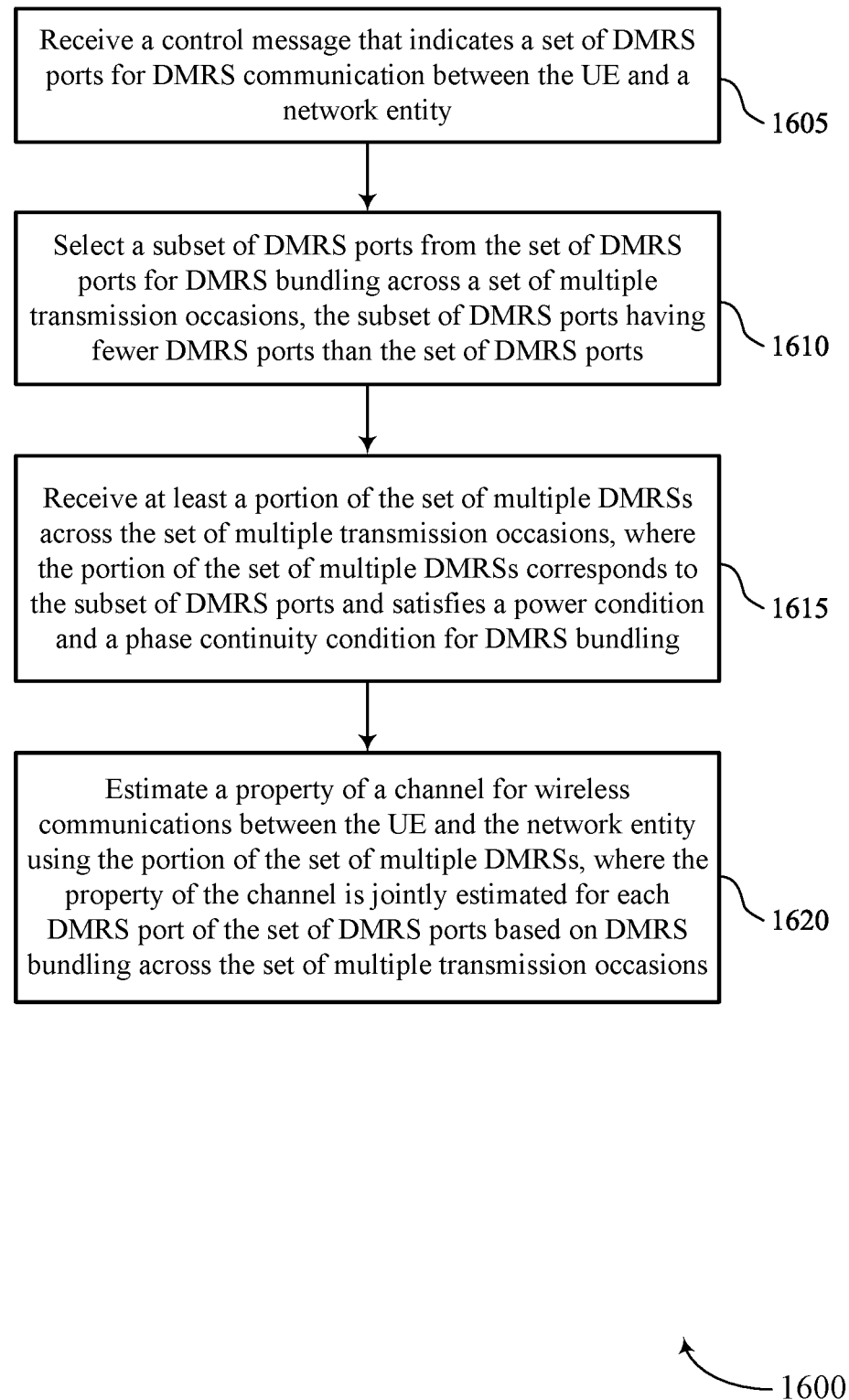

FIG. 16 shows a flowchart illustrating a method 1600 that supports DMRS bundling across a subset of DMRS ports in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving a control message that indicates a set of DMRS ports for DMRS communication between the UE and a network entity. The operations of 1605 may be performed in accordance with examples as disclosed herein. In some examples, aspects of the operations of 1605 may be performed by a DMRS port indication component 925 as described with reference to FIG. 9.

At 1610, the method may include selecting a subset of DMRS ports from the set of DMRS ports for DMRS bundling across a set of multiple transmission occasions, the subset of DMRS ports having fewer DMRS ports than the set of DMRS ports. The operations of 1610 may be performed in accordance with examples as disclosed herein. In some examples, aspects of the operations of 1610 may be performed by a DMRS port selection component 930 as described with reference to FIG. 9.

At 1615, the method may include receiving at least a portion of the set of multiple DMRSs across the set of multiple transmission occasions, where the portion of the set of multiple DMRSs corresponds to the subset of DMRS ports and satisfies a power condition and a phase continuity condition for DMRS bundling. The operations of 1615 may be performed in accordance with examples as disclosed herein. In some examples, aspects of the operations of 1615 may be performed by a DMRS bundling component 935 as described with reference to FIG. 9.

At 1620, the method may include estimating a property of a channel for wireless communications between the UE and the network entity using the portion of the set of multiple DMRSs, where the property of the channel is jointly estimated for each DMRS port of the set of DMRS ports based on DMRS bundling across the set of multiple transmission occasions. The operations of 1620 may be performed in accordance with examples as disclosed herein. In some examples, aspects of the operations of 1620 may be performed by a channel estimation component 940 as described with reference to FIG. 9.

Figure 17:
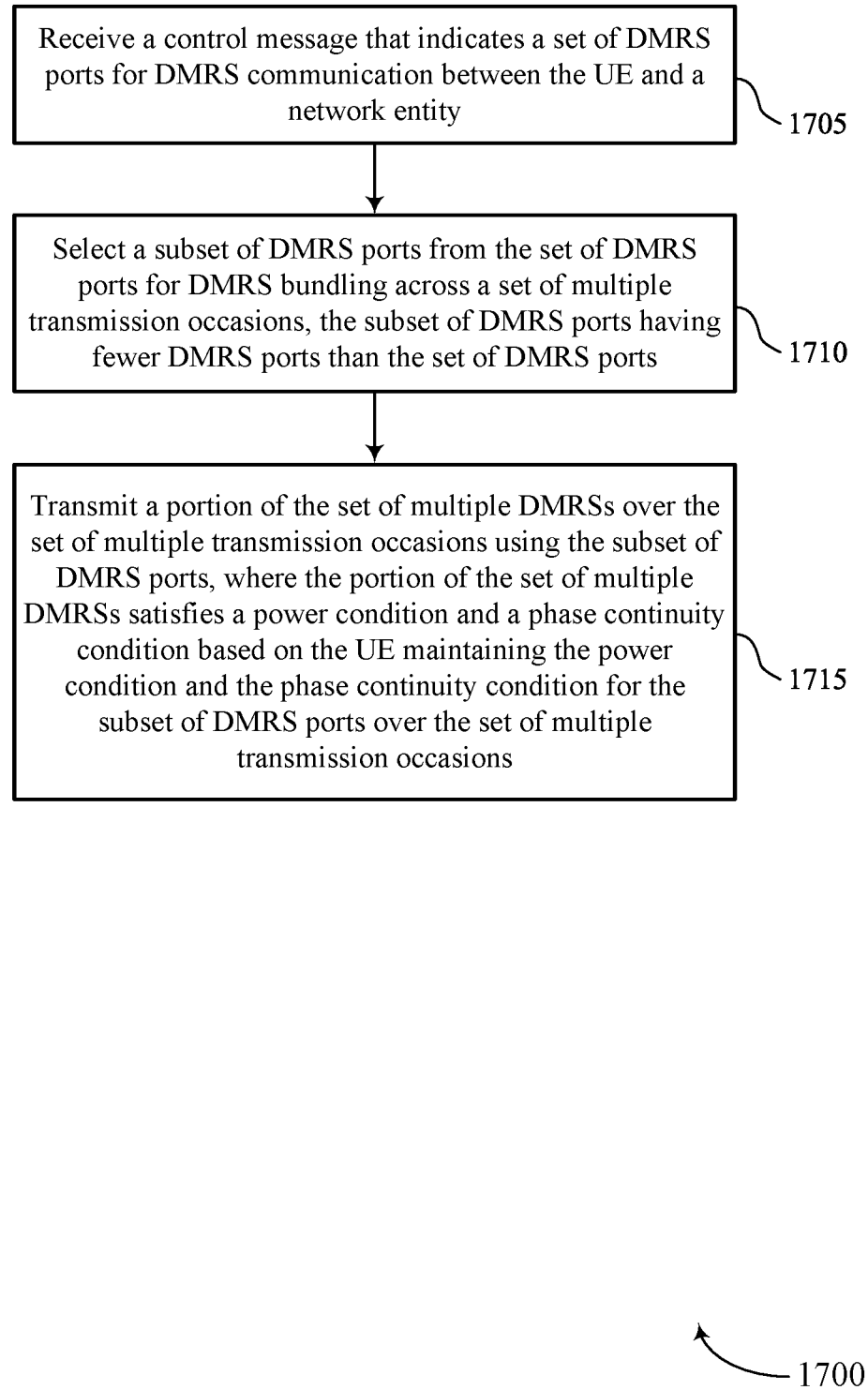

FIG. 17 shows a flowchart illustrating a method 1700 that supports DMRS bundling across a subset of DMRS ports in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the wireless UE to perform the described functions. Additionally, or alternatively, the wireless UE may perform aspects of the described functions using special-purpose hardware.

At 1705, the method may include receiving a control message that indicates a set of DMRS ports for DMRS communication between the UE and a network entity. The operations of 1705 may be performed in accordance with examples as disclosed herein. In some examples, aspects of the operations of 1705 may be performed by a DMRS port indication component 925 as described with reference to FIG. 9.

At 1710, the method may include selecting a subset of DMRS ports from the set of DMRS ports for DMRS bundling across a set of multiple transmission occasions, the subset of DMRS ports having fewer DMRS ports than the set of DMRS ports. The operations of 1710 may be performed in accordance with examples as disclosed herein. In some examples, aspects of the operations of 1710 may be performed by a DMRS port selection component 930 as described with reference to FIG. 9.

At 1715, the method may include transmitting a portion of the set of multiple DMRSs over the set of multiple transmission occasions using the subset of DMRS ports, where the portion of the set of multiple DMRSs satisfies a power condition and a phase continuity condition based on the UE maintaining the power condition and the phase continuity condition for the subset of DMRS ports over the set of multiple transmission occasions. The operations of 1720 may be performed in accordance with examples as disclosed herein. In some examples, aspects of the operations of 1720 may be performed by a DMRS bundling component 935 as described with reference to FIG. 9.

Figure 18:
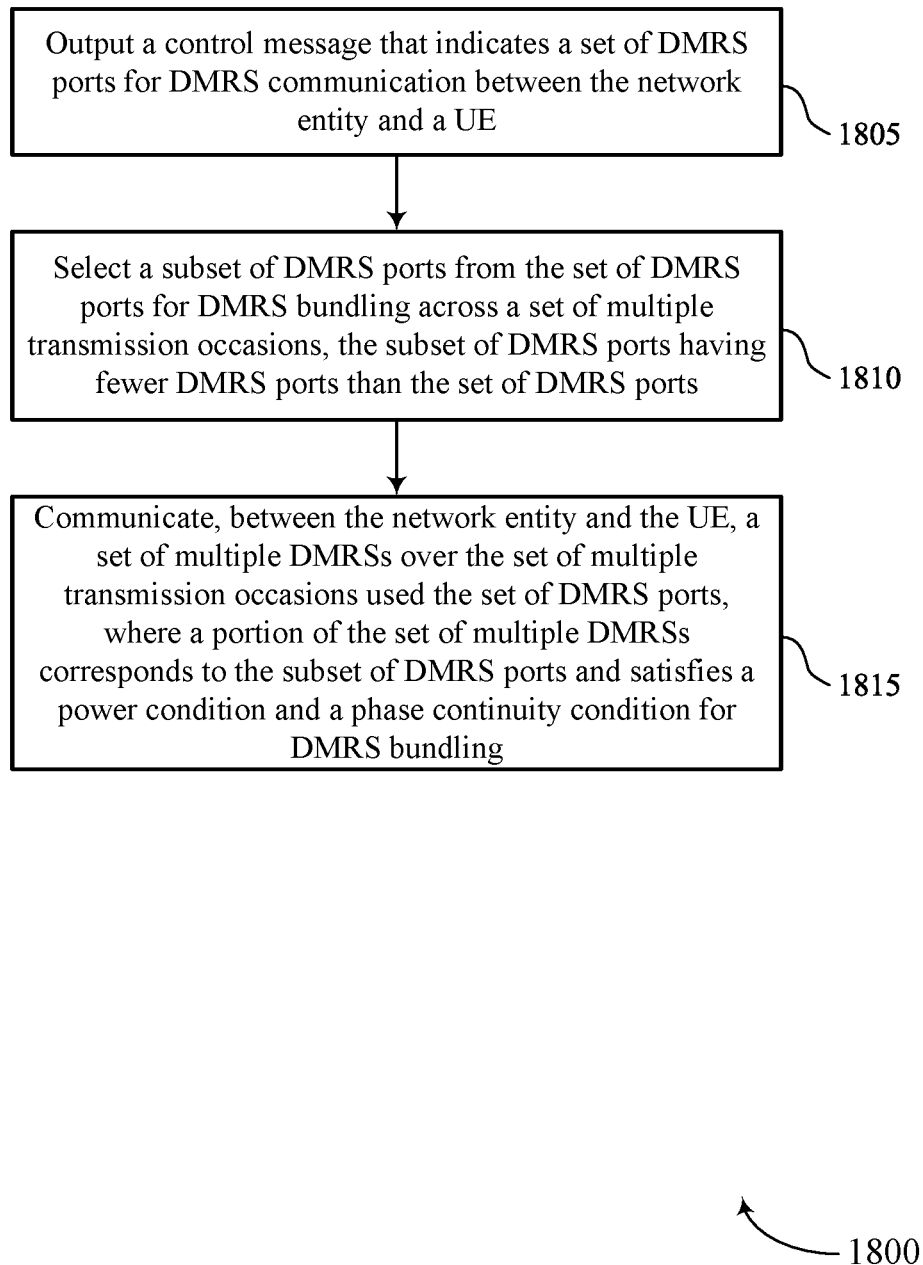

FIG. 18 shows a flowchart illustrating a method 1800 that supports DMRS bundling across a subset of DMRS ports in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include outputting a control message that indicates a set of DMRS ports for DMRS communication between the network entity and a UE. The operations of 1805 may be performed in accordance with examples as disclosed herein. In some examples, aspects of the operations of 1805 may be performed by a port indication component 1325 as described with reference to FIG. 13.

At 1810, the method may include selecting a subset of DMRS ports from the set of DMRS ports for DMRS bundling across a set of multiple transmission occasions, the subset of DMRS ports having fewer DMRS ports than the set of DMRS ports. The operations of 1810 may be performed in accordance with examples as disclosed herein. In some examples, aspects of the operations of 1810 may be performed by a port selection component 1330 as described with reference to FIG. 13.

At 1815, the method may include communicating, between the network entity and the UE, a set of multiple DMRSs over the set of multiple transmission occasions using the set of DMRS ports, where a portion of the set of multiple DMRSs corresponds to the subset of DMRS ports and satisfies a power condition and a phase continuity condition for DMRS bundling. The operations of 1815 may be performed in accordance with examples as disclosed herein. In some examples, aspects of the operations of 1815 may be performed by a bundling component 1335 as described with reference to FIG. 13.

The following provides an overview of aspects of the present disclosure:

Aspect 1: A method for wireless communications at a UE, comprising: receiving a control message that indicates a set of DMRS ports for DMRS communication between the UE and a network entity; selecting a subset of DMRS ports from the set of DMRS ports for DMRS bundling across a plurality of transmission occasions, the subset of DMRS ports having fewer DMRS ports than the set of DMRS ports; and communicating, between the UE and the network entity, a plurality of DMRSs over the plurality of transmission occasions using the set of DMRS ports, wherein a portion of the plurality of DMRSs corresponds to the subset of DMRS ports and satisfies a power condition and a phase continuity condition for DMRS bundling.

Aspect 2: The method of aspect 1, wherein communicating the plurality of DMRSs comprises: receiving at least the portion of the plurality of DMRSs across the plurality of transmission occasions; and estimating a property of a channel for wireless communications between the UE and the network entity using the portion of the plurality of DMRSs, wherein the property of the channel is jointly estimated for each DMRS port of the set of DMRS ports based at least in part on DMRS bundling across the plurality of transmission occasions.

Aspect 3: The method of aspect 1, wherein communicating the plurality of DMRSs comprises: transmitting the portion of the plurality of DMRSs over the plurality of transmission occasions using the subset of DMRS ports, wherein the portion of the plurality of DMRSs satisfies the power condition and the phase continuity condition based at least in part on the UE maintaining the power condition and the phase continuity condition for the subset of DMRS ports over the plurality of transmission occasions.

Aspect 4: The method of any of aspects 1 through 3, further comprising: receiving a second control message that schedules a plurality of repetitions of a transport block during the plurality of transmission occasions, each repetition of the plurality of repetitions corresponding to a respective transmission occasion of the plurality of transmission occasions.

Aspect 5: The method of any of aspects 1 through 3, further comprising: receiving one or more control messages that schedule communication of a plurality of transport blocks during the plurality of transmission occasions, each transport block of the plurality of transport blocks corresponding to a respective transmission occasion of the plurality of transmission occasions.

Aspect 6: The method of any of aspects 1 through 5, further comprising: receiving one or more control messages that schedule the plurality of transmission occasions, the plurality of transmission occasions including at least one communication via a shared channel and at least one other communication via a control channel.

Aspect 7: The method of any of aspects 1 through 6, wherein selecting the subset of DMRS ports comprises: excluding from the subset of DMRS ports one or more DMRS ports of the set of DMRS ports that are unused for DMRS communication between the UE and the network entity during at least one transmission occasion of the plurality of transmission occasions.

Aspect 8: The method of any of aspects 1 through 7, wherein selecting the subset of DMRS ports comprises: selecting the subset of DMRS ports from the set of DMRS ports based at least in part on a respective order of each DMRS port of the subset of DMRS ports within the set of DMRS ports.

Aspect 9: The method of aspect 8, further comprising: receiving an indication of a quantity of DMRS ports to be included in the subset of DMRS ports.

Aspect 10: The method of any of aspects 1 through 9, further comprising: receiving, from the network entity, an indication of one or more DMRS ports of the set of DMRS ports used for DMRS bundling, wherein the subset of DMRS ports comprises the one or more DMRS ports.

Aspect 11: The method of any of aspects 1 through 10, wherein selecting the subset of DMRS ports comprises: selecting the subset of DMRS ports from the set of DMRS ports based at least in part on one or more of: a CDM group, a codeword, or a TCI state associated with each DMRS port of the subset of DMRS ports.

Aspect 12: The method of any of aspects 1 through 11, wherein the subset of DMRS ports includes a same quantity of DMRS ports across the plurality of transmission occasions.

Aspect 13: The method of any of aspects 1 through 12, wherein the subset of DMRS ports is associated with a same PRG size across the plurality of transmission occasions.

Aspect 14: The method of any of aspects 1 through 13, wherein the set of DMRS ports is associated with a plurality of codewords, and the subset of DMRS ports is associated with a codeword of the plurality of codewords.

Aspect 15: A method for wireless communications at a network entity, comprising: outputting a control message that indicates a set of DMRS ports for DMRS communication between the network entity and a UE; selecting a subset of DMRS ports from the set of DMRS ports for DMRS bundling across a plurality of transmission occasions, the subset of DMRS ports having fewer DMRS ports than the set of DMRS ports; and communicating, between the network entity and the UE, a plurality of DMRSs over the plurality of transmission occasions using the set of DMRS ports, wherein a portion of the plurality of DMRSs corresponds to the subset of DMRS ports and satisfies a power condition and a phase continuity condition for DMRS bundling.

Aspect 16: The method of aspect 15, wherein communicating the plurality of DMRSs comprises: obtaining at least the portion of the plurality of DMRSs across the plurality of transmission occasions; and estimating a property of a channel for wireless communications between the network entity and the UE using the portion of the plurality of DMRSs, wherein the property of the channel is jointly estimated for each DMRS port of the set of DMRS ports based at least in part on DMRS bundling across the plurality of transmission occasions.

Aspect 17: The method of aspect 15, wherein communicating the plurality of DMRSs comprises: outputting the portion of the plurality of DMRSs over the plurality of transmission occasions using the subset of DMRS ports, wherein the portion of the plurality of DMRSs satisfies the power condition and the phase continuity condition based at least in part on the network entity maintaining the power condition and the phase continuity condition for the subset of DMRS ports over the plurality of transmission occasions.

Aspect 18: The method of any of aspects 15 through 17, further comprising: outputting a second control message that schedules a plurality of repetitions of a transport block during the plurality of transmission occasions, each repetition of the plurality of repetitions corresponding to a respective transmission occasion of the plurality of transmission occasions.

Aspect 19: The method of any of aspects 15 through 17, further comprising: outputting one or more control messages that schedule communication of a plurality of transport blocks during the plurality of transmission occasions, each transport block of the plurality of transport blocks corresponding to a respective transmission occasion of the plurality of transmission occasions.

Aspect 20: The method of any of aspects 15 through 19, further comprising: outputting one or more control messages that schedule the plurality of transmission occasions, the plurality of transmission occasions including at least one communication via a shared channel and at least one other communication via a control channel.

Aspect 21: The method of any of aspects 15 through 20, wherein selecting the subset of DMRS ports comprises: excluding from the subset of DMRS ports one or more DMRS ports of the set of DMRS ports that are unused for DMRS communication between the UE and the network entity during at least one transmission occasion of the plurality of transmission occasions.

Aspect 22: The method of any of aspects 15 through 21, wherein selecting the subset of DMRS ports comprises: selecting the subset of DMRS ports from the set of DMRS ports based at least in part on a respective order of each DMRS port of the subset of DMRS ports within the set of DMRS ports.

Aspect 23: The method of aspect 22, further comprising: outputting an indication of a quantity of DMRS ports to be included in the subset of DMRS ports.

Aspect 24: The method of any of aspects 15 through 23, further comprising: outputting an indication of one or more DMRS ports of the set of DMRS ports used for DMRS bundling, wherein the subset of DMRS ports comprises the one or more DMRS ports.

Aspect 25: The method of any of aspects 15 through 24, wherein selecting the subset of DMRS ports comprises: selecting the subset of DMRS ports from the set of DMRS ports based at least in part on one or more of: a CDM group, a codeword, or a TCI state associated with each DMRS port of the subset of DMRS ports.

Aspect 26: The method of any of aspects 15 through 25, wherein the subset of DMRS ports includes a same quantity of DMRS ports across the plurality of transmission occasions.

Aspect 27: The method of any of aspects 15 through 26, wherein the subset of DMRS ports is associated with a same PRG size across the plurality of transmission occasions.

Aspect 28: The method of any of aspects 15 through 27, wherein the set of DMRS ports is associated with a plurality of codewords, and the subset of DMRS ports is associated with a codeword of the plurality of codewords.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity, comprising a processor; memory coupled with the processor; and instructions stored in the memory and executable by the processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
one or more memories storing processor-executable code; and
one or more processors coupled with the one or more memories and individually or collectively operable to execute the code to cause the UE to:
receive a control message that indicates a set of demodulation reference signal (DMRS) ports for DMRS communication between the UE and a network entity;
select a subset of DMRS ports from the set of DMRS ports for DMRS bundling across a plurality of transmission occasions, the subset of DMRS ports having fewer DMRS ports than the set of DMRS ports, wherein the DMRS bundling is for joint processing of one or more DMRSs corresponding to the subset of DMRS ports; and
communicate, between the UE and the network entity, a plurality of DMRSs over the plurality of transmission occasions using the set of DMRS ports, the plurality of DMRSs comprising the one or more DMRSs that satisfy a power condition and a phase continuity condition for the DMRS bundling.

2. The UE of claim 1, wherein, to communicate the plurality of DMRSs, the one or more processors are individually or collectively operable to execute the code to cause the UE to:
receive at least the one or more DMRSs across the plurality of transmission occasions; and
estimate a property of a channel for the wireless communications between the UE and the network entity using the one or more DMRSs, wherein the property of the channel is jointly estimated for each DMRS port of the set of DMRS ports based at least in part on the DMRS bundling across the plurality of transmission occasions.

3. The UE of claim 1, wherein, to communicate the plurality of DMRSs, the one or more processors are individually or collectively operable to execute the code to cause the UE to:
transmit the one or more DMRSs over the plurality of transmission occasions using the subset of DMRS ports, wherein the one or more DMRSs satisfy the power condition and the phase continuity condition based at least in part on the UE maintaining the power condition and the phase continuity condition for the subset of DMRS ports over the plurality of transmission occasions.

4. The UE of claim 1, wherein the one or more processors are individually or collectively further operable to execute the code to cause the UE to:
receive a second control message that schedules a plurality of repetitions of a transport block during the plurality of transmission occasions, each repetition of the plurality of repetitions corresponding to a respective transmission occasion of the plurality of transmission occasions.

5. The UE of claim 1, wherein the one or more processors are individually or collectively further operable to execute the code to cause the UE to:
receive one or more control messages that schedule communication of a plurality of transport blocks during the plurality of transmission occasions, each transport block of the plurality of transport blocks corresponding to a respective transmission occasion of the plurality of transmission occasions.

6. The UE of claim 1, wherein the one or more processors are individually or collectively further operable to execute the code to cause the UE to:
receive one or more control messages that schedule the plurality of transmission occasions, the plurality of transmission occasions including at least one communication via a shared channel and at least one other communication via a control channel.

7. The UE of claim 1, wherein, to select the subset of DMRS ports, the one or more processors are individually or collectively operable to execute the code to cause the UE to:
exclude, from the subset of DMRS ports, one or more DMRS ports of the set of DMRS ports that are unused for DMRS communication between the UE and the network entity during at least one transmission occasion of the plurality of transmission occasions.

8. The UE of claim 1, wherein, to select the subset of DMRS ports, the one or more processors are individually or collectively operable to execute the code to cause the UE to:
select the subset of DMRS ports from the set of DMRS ports based at least in part on a respective order of each DMRS port of the subset of DMRS ports within the set of DMRS ports.

9. The UE of claim 8, wherein the one or more processors are individually or collectively further operable to execute the code to cause the UE to:
receive an indication of a quantity of DMRS ports to be included in the subset of DMRS ports.

10. The UE of claim 1, wherein the one or more processors are individually or collectively further operable to execute the code to cause the UE to:
receive, from the network entity, an indication of one or more DMRS ports of the set of DMRS ports used for the DMRS bundling, wherein the subset of DMRS ports comprises the one or more DMRS ports.

11. The UE of claim 1, wherein, to select the subset of DMRS ports, the one or more processors are individually or collectively operable to execute the code to cause the UE to:
select the subset of DMRS ports from the set of DMRS ports based at least in part on one or more of: a code division multiplexing group, a codeword, or a transmission configuration indicator (TCI) state associated with each DMRS port of the subset of DMRS ports.

12. The UE of claim 1, wherein the subset of DMRS ports includes a same quantity of DMRS ports across the plurality of transmission occasions.

13. The UE of claim 1, wherein the subset of DMRS ports is associated with a same precoding resource block group size across the plurality of transmission occasions.

14. The UE of claim 1, wherein:
the set of DMRS ports is associated with a plurality of codewords, and
the subset of DMRS ports is associated with a codeword of the plurality of codewords.

15. A network entity for wireless communications, comprising:
one or more memories storing processor-executable code; and
one or more processors coupled with the one or more memories and individually or collectively operable to execute the code to cause the apparatus network entity to:
output a control message that indicates a set of demodulation reference signal (DMRS) ports for DMRS communication between the network entity and a user equipment (UE);
select a subset of DMRS ports from the set of DMRS ports for DMRS bundling across a plurality of transmission occasions, the subset of DMRS ports having fewer DMRS ports than the set of DMRS ports, wherein the DMRS bundling is for joint processing of one or more DMRSs corresponding to the subset of DMRS ports; and
communicate, between the network entity and the UE, a plurality of DMRSs over the plurality of transmission occasions using the set of DMRS ports, the plurality of DMRSs comprising the one or more DMRSs that satisfy a power condition and a phase continuity condition for the DMRS bundling.

16. The network entity of claim 15, wherein, to communicate the plurality of DMRSs, the one or more processors are individually or collectively operable to execute the code to cause the network entity to:
obtain at least the one or more DMRSs across the plurality of transmission occasions; and
estimate a property of a channel for the wireless communications between the network entity and the UE using the one or more DMRSs, wherein the property of the channel is jointly estimated for each DMRS port of the set of DMRS ports based at least in part on the DMRS bundling across the plurality of transmission occasions.

17. The network entity of claim 15, wherein, to communicate the plurality of DMRSs, the one or more processors are individually or collectively operable to execute the code to cause the network entity to:
output the one or more DMRSs over the plurality of transmission occasions using the subset of DMRS ports, wherein the one or more DMRSs satisfies the power condition and the phase continuity condition based at least in part on the network entity maintaining the power condition and the phase continuity condition for the subset of DMRS ports over the plurality of transmission occasions.

18. The network entity of claim 15, wherein the one or more processors are individually or collectively further operable to execute the code to cause the network entity to:
output a second control message that schedules a plurality of repetitions of a transport block during the plurality of transmission occasions, each repetition of the plurality of repetitions corresponding to a respective transmission occasion of the plurality of transmission occasions.

19. The network entity of claim 15, wherein the one or more processors are individually or collectively further operable to execute the code to cause the network entity to:
output one or more control messages that schedule communication of a plurality of transport blocks during the plurality of transmission occasions, each transport block of the plurality of transport blocks corresponding to a respective transmission occasion of the plurality of transmission occasions.

20. The network entity of claim 15, wherein the one or more processors are individually or collectively further operable to execute the code to cause the network entity to:
output one or more control messages that schedule the plurality of transmission occasions, the plurality of transmission occasions including at least one communication via a shared channel and at least one other communication via a control channel.

21. The network entity of claim 15, wherein, to select the subset of DMRS ports, the one or more processors are individually or collectively operable to execute the code to cause the network entity to:
exclude from the subset of DMRS ports one or more DMRS ports of the set of DMRS ports that are unused for DMRS communication between the UE and the network entity during at least one transmission occasion of the plurality of transmission occasions.

22. The network entity of claim 15, wherein, to select the subset of DMRS ports, the one or more processors are individually or collectively operable to execute the code to cause the network entity to:
select the subset of DMRS ports from the set of DMRS ports based at least in part on a respective order of each DMRS port of the subset of DMRS ports within the set of DMRS ports.

23. The network entity of claim 22, wherein the one or more processors are individually or collectively further operable to execute the code to cause the network entity to:
output an indication of a quantity of DMRS ports to be included in the subset of DMRS ports.

24. The network entity of claim 15, wherein the one or more processors are individually or collectively further operable to execute the code to cause the network entity to:
output an indication of one or more DMRS ports of the set of DMRS ports used for the DMRS bundling, wherein the subset of DMRS ports comprises the one or more DMRS ports.

25. The network entity of claim 15, wherein, to select the subset of DMRS ports, the one or more processors are individually or collectively operable to execute the code to cause the network entity to:
select the subset of DMRS ports from the set of DMRS ports based at least in part on one or more of: a code division multiplexing group, a codeword, or a transmission configuration indicator (TCI) state associated with each DMRS port of the subset of DMRS ports.

26. The network entity of claim 15, wherein the subset of DMRS ports includes a same quantity of DMRS ports across the plurality of transmission occasions.

27. The network entity of claim 15, wherein the subset of DMRS ports is associated with a same precoding resource block group size across the plurality of transmission occasions.

28. The network entity of claim 15, wherein:
the set of DMRS ports is associated with a plurality of codewords, and
the subset of DMRS ports is associated with a codeword of the plurality of codewords.

29. A method for wireless communications at a user equipment (UE), comprising:
receiving a control message that indicates a set of demodulation reference signal (DMRS) ports for DMRS communication between the UE and a network entity;
selecting a subset of DMRS ports from the set of DMRS ports for DMRS bundling across a plurality of transmission occasions, the subset of DMRS ports having fewer DMRS ports than the set of DMRS ports, wherein the DMRS bundling is for joint processing of one or more DMRSs corresponding to the subset of DMRS ports; and
communicating, between the UE and the network entity, a plurality of DMRSs over the plurality of transmission occasions using the set of DMRS ports, the plurality of DMRSs comprising the one or more DMRSs that satisfy a power condition and a phase continuity condition for the DMRS bundling.

30. A method for wireless communications at a network entity, comprising:
outputting a control message that indicates a set of demodulation reference signal (DMRS) ports for DMRS communication between the network entity and a user equipment (UE);
selecting a subset of DMRS ports from the set of DMRS ports for DMRS bundling across a plurality of transmission occasions, the subset of DMRS ports having fewer DMRS ports than the set of DMRS ports, wherein the DMRS bundling is for joint processing of one or more DMRSs corresponding to the subset of DMRS ports; and
communicating, between the network entity and the UE, a plurality of DMRSs over the plurality of transmission occasions using the set of DMRS ports, the plurality of DMRSs comprising the one or more DMRSs that satisfy a power condition and a phase continuity condition for the DMRS bundling.

* * * * *